(12) United States Patent
Barnes et al.

(10) Patent No.: US 10,410,237 B1
(45) Date of Patent: Sep. 10, 2019

(54) INVENTORY MANAGEMENT INTEGRATING SUBSCRIBER AND TARGETING DATA

(75) Inventors: James D. Barnes, Overland Park, KS (US); Sanjay K. Sharma, Olathe, KS (US); Peter H. Distler, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 3217 days.

(21) Appl. No.: 11/474,880

(22) Filed: Jun. 26, 2006

(51) Int. Cl.
*G06Q 30/00* (2012.01)
*G06Q 30/02* (2012.01)

(52) U.S. Cl.
CPC ................ *G06Q 30/0241* (2013.01)

(58) Field of Classification Search
USPC .......................................................... 705/14
See application file for complete search history.

(56) References Cited

U.S. PATENT DOCUMENTS

| | | |
|---|---|---|
| 5,636,346 A | 6/1997 | Saxe |
| 5,761,648 A | 6/1998 | Golden et al. |
| 5,848,396 A | 12/1998 | Gerace |
| 5,848,397 A | 12/1998 | Marsh et al. |
| 5,918,014 A | 6/1999 | Robinson |
| 5,918,041 A | 6/1999 | Berstis |
| 5,933,811 A | 8/1999 | Angles et al. |
| 5,937,392 A | 8/1999 | Alberts |
| 5,974,398 A | 10/1999 | Hanson et al. |
| 6,202,023 B1 | 3/2001 | Hancock et al. |
| 6,233,566 B1 | 5/2001 | Levine et al. |
| 6,266,649 B1 | 7/2001 | Linden et al. |
| 6,286,005 B1 | 9/2001 | Cannon |
| 6,317,722 B1 | 11/2001 | Jacobi et al. |
| 6,321,983 B1 | 11/2001 | Katayanagi et al. |
| 6,332,127 B1 | 12/2001 | Bandera et al. |
| 6,826,575 B1 | 11/2004 | Waclawski |
| 6,834,266 B2 | 12/2004 | Kumar et al. |
| 6,839,680 B1 | 1/2005 | Liu et al. |
| 6,853,982 B2 | 2/2005 | Smith et al. |
| 6,910,017 B1 | 6/2005 | Woo et al. |

(Continued)

FOREIGN PATENT DOCUMENTS

| | | |
|---|---|---|
| JP | 2002041944 A | 2/2002 |
| JP | 2002185613 A | 6/2002 |

(Continued)

OTHER PUBLICATIONS

Patent application entitled "Dynamic Advertising Content Distribution and Placement Sysstems and Methods," filed Apr. 17, 2006, as U.S. Appl. No. 11/405,195.

(Continued)

*Primary Examiner* — Alvin L Brown

(57) ABSTRACT

Systems and methods for inventory management integrating subscriber and targeting data are provided. The method includes tracking historical inventory during a first time period for each of a plurality of advertising spots, the number of impressions for each spot. Each impression is categorized by segment. The method further includes predicting a future inventory available for a second time period based on the tracked inventory, and subtracting, on a segment-by-segment basis, inventory that is sold from the future inventory.

12 Claims, 7 Drawing Sheets

(56) References Cited

U.S. PATENT DOCUMENTS

| | | |
|---|---|---|
| 6,963,867 B2 | 11/2005 | Ford et al. |
| 6,966,536 B2 | 11/2005 | Enomoto et al. |
| 6,990,462 B1* | 1/2006 | Wilcox et al. ............ 705/14.61 |
| 7,022,905 B1 | 4/2006 | Hinman et al. |
| 7,065,532 B2 | 6/2006 | Elder et al. |
| 7,096,194 B2 | 8/2006 | Johnson |
| 7,127,313 B2 | 10/2006 | Neri |
| 7,143,143 B1 | 11/2006 | Thompson |
| 7,251,615 B2 | 7/2007 | Woo |
| 7,284,033 B2 | 10/2007 | Jhanji |
| 7,328,169 B2 | 2/2008 | Temares et al. |
| 7,353,267 B1 | 4/2008 | Cunningham et al. |
| 7,406,436 B1 | 7/2008 | Reisman |
| 7,437,308 B2 | 10/2008 | Kumar et al. |
| 7,481,367 B2 | 1/2009 | Fees et al. |
| 7,647,258 B2 | 1/2010 | William et al. |
| 7,676,394 B2 | 3/2010 | Ramer et al. |
| 7,698,335 B1 | 4/2010 | Vronay |
| 7,788,644 B2 | 8/2010 | Koduru et al. |
| 7,801,518 B1 | 9/2010 | Urbanek |
| 7,801,843 B2 | 9/2010 | Kumar et al. |
| 7,840,498 B2 | 11/2010 | Frank et al. |
| 7,958,005 B2 | 6/2011 | Dangaltchev |
| 7,974,616 B1 | 7/2011 | Urbanek |
| 8,326,673 B1 | 12/2012 | Biere et al. |
| 8,355,955 B1 | 1/2013 | Mirchandani et al. |
| 8,423,408 B1 | 4/2013 | Barnes et al. |
| 8,442,858 B1 | 5/2013 | Barnes et al. |
| 8,509,821 B1 | 8/2013 | Zang et al. |
| 8,650,184 B2 | 2/2014 | Kowalchuk et al. |
| 9,275,390 B1 | 3/2016 | Barnes et al. |
| 9,319,379 B1 | 4/2016 | Burnham et al. |
| 9,374,335 B2 | 6/2016 | Burnham et al. |
| 9,508,090 B1 | 11/2016 | Belser et al. |
| 9,590,938 B1 | 3/2017 | Burcham et al. |
| 9,734,515 B1 | 8/2017 | Belser et al. |
| 10,068,261 B1 | 9/2018 | Barnes et al. |
| 2001/0039500 A1 | 11/2001 | Johnson |
| 2001/0044743 A1 | 11/2001 | McKinley et al. |
| 2001/0047294 A1 | 11/2001 | Rothschild |
| 2002/0010627 A1 | 1/2002 | Lerat |
| 2002/0013727 A1 | 1/2002 | Lee |
| 2002/0026355 A1 | 2/2002 | Mitsuoko et al. |
| 2002/0026361 A1 | 2/2002 | Blom |
| 2002/0030100 A1 | 3/2002 | Katayanagi et al. |
| 2002/0032771 A1 | 3/2002 | Gledje |
| 2002/0035474 A1 | 3/2002 | Alpdemir |
| 2002/0059387 A1 | 5/2002 | Wolfe |
| 2002/0060246 A1 | 5/2002 | Gobburu et al. |
| 2002/0065713 A1 | 5/2002 | Awada et al. |
| 2002/0091569 A1 | 7/2002 | Kitaura et al. |
| 2002/0091571 A1 | 7/2002 | Thomas et al. |
| 2002/0095333 A1 | 7/2002 | Jokinen et al. |
| 2002/0107027 A1 | 8/2002 | O'Neil |
| 2002/0128904 A1 | 9/2002 | Carruthers et al. |
| 2002/0128908 A1 | 9/2002 | Levin et al. |
| 2002/0143630 A1 | 10/2002 | Steinman et al. |
| 2002/0152133 A1 | 10/2002 | King et al. |
| 2002/0165849 A1 | 11/2002 | Singh et al. |
| 2002/0184080 A1 | 12/2002 | Murad et al. |
| 2003/0004802 A1 | 1/2003 | Callegari |
| 2003/0004808 A1 | 1/2003 | Elhaoussine et al. |
| 2003/0007643 A1 | 1/2003 | Ben-Zur et al. |
| 2003/0018516 A1* | 1/2003 | Ayala et al. .................... 705/10 |
| 2003/0018558 A1 | 1/2003 | Heffner et al. |
| 2003/0023482 A1 | 1/2003 | Messner et al. |
| 2003/0028451 A1 | 2/2003 | Ananian |
| 2003/0032409 A1 | 2/2003 | Hutcheson et al. |
| 2003/0050863 A1 | 3/2003 | Radwin |
| 2003/0074251 A1 | 4/2003 | Kumar et al. |
| 2003/0074259 A1 | 4/2003 | Slyman, Jr. et al. |
| 2003/0101024 A1 | 5/2003 | Adar et al. |
| 2003/0101449 A1 | 5/2003 | Bentolila et al. |
| 2003/0126250 A1 | 7/2003 | Jhanji |
| 2003/0171962 A1 | 9/2003 | Hirth et al. |
| 2003/0172007 A1 | 9/2003 | Helmolt et al. |
| 2003/0229502 A1 | 12/2003 | Woo |
| 2004/0019540 A1 | 1/2004 | William et al. |
| 2004/0019541 A1 | 1/2004 | William et al. |
| 2004/0111315 A1 | 6/2004 | Sharma et al. |
| 2004/0148628 A1 | 7/2004 | Mears |
| 2004/0194052 A1 | 9/2004 | Hoffschulz et al. |
| 2005/0021403 A1* | 1/2005 | Ozer et al. ...................... 705/14 |
| 2005/0028188 A1 | 2/2005 | Latona et al. |
| 2005/0078660 A1 | 4/2005 | Wood |
| 2005/0080772 A1 | 4/2005 | Bem |
| 2005/0101332 A1 | 5/2005 | Kotzin |
| 2005/0102272 A1 | 5/2005 | Kumar et al. |
| 2005/0114829 A1 | 5/2005 | Robin et al. |
| 2005/0177419 A1 | 8/2005 | Choi et al. |
| 2005/0177449 A1 | 8/2005 | Temares et al. |
| 2005/0193036 A1 | 9/2005 | Phillips et al. |
| 2005/0194431 A1 | 9/2005 | Fees et al. |
| 2005/0197887 A1 | 9/2005 | Zuerl et al. |
| 2005/0197918 A1 | 9/2005 | Wittmer et al. |
| 2005/0215238 A1 | 9/2005 | Macaluso |
| 2005/0228754 A1 | 10/2005 | Pezzaniti et al. |
| 2005/0245246 A1 | 11/2005 | Munch et al. |
| 2005/0246394 A1 | 11/2005 | Neri |
| 2005/0254712 A1 | 11/2005 | Lindeman |
| 2005/0256759 A1 | 11/2005 | Acharya et al. |
| 2005/0278296 A1 | 12/2005 | Bostwick |
| 2006/0026060 A1 | 2/2006 | Collins |
| 2006/0056433 A1 | 3/2006 | Herrmann |
| 2006/0074769 A1 | 4/2006 | Looney et al. |
| 2006/0080135 A1 | 4/2006 | Frank et al. |
| 2006/0080171 A1* | 4/2006 | Jardins et al. ................. 705/14 |
| 2006/0085253 A1 | 4/2006 | Mengerink et al. |
| 2006/0085517 A1 | 4/2006 | Kaurila |
| 2006/0141428 A1 | 6/2006 | Herrod et al. |
| 2006/0173556 A1 | 8/2006 | Rosenberg |
| 2006/0178932 A1 | 8/2006 | Lang |
| 2006/0178939 A1 | 8/2006 | Lang |
| 2006/0212350 A1 | 9/2006 | Ellis et al. |
| 2006/0223495 A1 | 10/2006 | Cassett et al. |
| 2006/0224437 A1 | 10/2006 | Gupta et al. |
| 2006/0282316 A1 | 12/2006 | Snyder et al. |
| 2007/0005647 A1 | 1/2007 | Cugi et al. |
| 2007/0022009 A1 | 1/2007 | Cataldi et al. |
| 2007/0026871 A1 | 2/2007 | Wager |
| 2007/0060099 A1 | 3/2007 | Ramer et al. |
| 2007/0061229 A1 | 3/2007 | Ramer et al. |
| 2007/0094042 A1 | 4/2007 | Ramer et al. |
| 2007/0100963 A1 | 5/2007 | Ban et al. |
| 2007/0106520 A1 | 5/2007 | Akkiraju et al. |
| 2007/0130005 A1 | 6/2007 | Jaschke |
| 2007/0192715 A1 | 8/2007 | Kataria et al. |
| 2007/0198339 A1 | 8/2007 | Shen et al. |
| 2007/0208619 A1 | 9/2007 | Branam et al. |
| 2007/0239518 A1 | 10/2007 | Chung et al. |
| 2008/0004884 A1 | 1/2008 | Flake et al. |
| 2008/0010137 A1 | 1/2008 | Ho et al. |
| 2008/0040175 A1 | 2/2008 | Dellovo |
| 2008/0045245 A1 | 2/2008 | Billmaier et al. |
| 2008/0065476 A1 | 3/2008 | Klein et al. |
| 2008/0082412 A1 | 4/2008 | Tallyn et al. |
| 2008/0090599 A1 | 4/2008 | Patel et al. |
| 2008/0097851 A1 | 4/2008 | Bemmel et al. |
| 2008/0098420 A1 | 4/2008 | Khivesara et al. |
| 2008/0104637 A1 | 5/2008 | Rodriguez et al. |
| 2008/0120565 A1 | 5/2008 | Stiso et al. |
| 2008/0126515 A1 | 5/2008 | Chambers et al. |
| 2008/0140476 A1 | 6/2008 | Anand et al. |
| 2008/0147478 A1 | 6/2008 | Mall et al. |
| 2008/0228583 A1 | 9/2008 | MacDonald et al. |
| 2009/0013051 A1 | 1/2009 | Renschler et al. |
| 2009/0029721 A1 | 1/2009 | Doraswamy |
| 2009/0030802 A1 | 1/2009 | Plotnick et al. |
| 2009/0048977 A1 | 2/2009 | Aggarwal et al. |
| 2009/0070129 A1 | 3/2009 | Inbar et al. |
| 2009/0076899 A1 | 3/2009 | Gbodimowo |
| 2009/0144139 A1 | 6/2009 | Gaedcke |
| 2009/0150215 A1 | 6/2009 | Kalb et al. |
| 2009/0157512 A1 | 6/2009 | King |

(56) References Cited

U.S. PATENT DOCUMENTS

| | | | |
|---|---|---|---|
| 2009/0198580 | A1 | 8/2009 | Kamangar |
| 2009/0216683 | A1 | 8/2009 | Gutierrez |
| 2009/0222329 | A1 | 9/2009 | Ramer et al. |
| 2009/0256858 | A1 | 10/2009 | Ogikubo et al. |
| 2009/0265245 | A1 | 10/2009 | Wright |
| 2009/0271255 | A1 | 10/2009 | Utter et al. |
| 2009/0292608 | A1 | 11/2009 | Polachek |
| 2010/0082422 | A1 | 4/2010 | Heilig et al. |
| 2010/0082429 | A1 | 4/2010 | Samdadiya et al. |
| 2010/0119111 | A1 | 5/2010 | Helfman et al. |
| 2010/0222035 | A1 | 9/2010 | Robertson et al. |
| 2010/0228592 | A1 | 9/2010 | Anderson et al. |
| 2011/0022447 | A1 | 1/2011 | Pelaic |
| 2011/0082939 | A1 | 4/2011 | Montemurro et al. |
| 2011/0106622 | A1 | 5/2011 | Kuhlman et al. |
| 2011/0131109 | A1 | 6/2011 | Pappas et al. |
| 2011/0246890 | A1 | 10/2011 | Mellamphy et al. |
| 2011/0258049 | A1 | 10/2011 | Ramer et al. |
| 2011/0270687 | A1 | 11/2011 | Bazaz |
| 2011/0288913 | A1 | 11/2011 | Waylonis et al. |
| 2011/0321167 | A1 | 12/2011 | Wu et al. |
| 2012/0072271 | A1 | 3/2012 | Dessert et al. |
| 2012/0123830 | A1 | 5/2012 | Svendsen et al. |
| 2012/0123862 | A1 | 5/2012 | Kurra et al. |
| 2012/0170521 | A1 | 7/2012 | Vogedes et al. |
| 2012/0179536 | A1 | 7/2012 | Kalb et al. |
| 2012/0215911 | A1 | 8/2012 | Raleigh et al. |
| 2013/0006743 | A1 | 1/2013 | Moore et al. |
| 2013/0018714 | A1 | 1/2013 | George |
| 2013/0060631 | A1 | 3/2013 | Corson et al. |
| 2013/0115872 | A1 | 5/2013 | Huang et al. |
| 2013/0138506 | A1 | 5/2013 | Zhu et al. |
| 2013/0211925 | A1 | 8/2013 | Holland |
| 2013/0211941 | A1 | 8/2013 | Hallowell et al. |
| 2013/0304586 | A1 | 11/2013 | Angles et al. |
| 2013/0311293 | A1 | 11/2013 | Ward et al. |
| 2013/0331027 | A1 | 12/2013 | Rose et al. |
| 2014/0006129 | A1 | 1/2014 | Heath |
| 2014/0052536 | A1 | 2/2014 | McAndrew et al. |
| 2014/0059141 | A1 | 2/2014 | Belkin et al. |
| 2014/0066029 | A1 | 3/2014 | Brennan et al. |
| 2014/0080467 | A1 | 3/2014 | Urbanek |
| 2014/0089113 | A1 | 3/2014 | Desai et al. |
| 2014/0136314 | A1 | 5/2014 | Kiet et al. |
| 2014/0222569 | A1 | 8/2014 | Kerr |
| 2014/0235265 | A1 | 8/2014 | Slupik |
| 2014/0274031 | A1 | 9/2014 | Menendez |
| 2014/0278953 | A1 | 9/2014 | Ismail et al. |
| 2014/0379448 | A1 | 12/2014 | Gregory |
| 2014/0379467 | A1 | 12/2014 | Huang et al. |
| 2015/0074204 | A1 | 3/2015 | Burcham et al. |
| 2015/0121418 | A1 | 4/2015 | Jain et al. |
| 2015/0208199 | A1 | 7/2015 | Li et al. |
| 2015/0249914 | A1 | 9/2015 | Yu et al. |

FOREIGN PATENT DOCUMENTS

| | | | |
|---|---|---|---|
| WO | WO03044703 | A1 | 5/2003 |
| WO | WO2012093396 | A1 | 7/2012 |
| WO | WO2015038562 | A1 | 3/2015 |

OTHER PUBLICATIONS

Patent application entitled "Communication Device Usage Event Profiling," filed Jun. 18, 2006, as U.S. Appl. No. 11/449,078.
Lightningcast, Inc., "Lightningcast Mobile Video Advertising Solution," May 2, 2005, 14 pgs.
Patent Application entitled, "Method and System Using Location History for Targeted Coupon Distribution," by Von K. McConnell, et al., filed May 17, 2000 as U.S. Appl. No. 09/572,282.
Patent Application entitled, "Systems and Methods for State-Based Advertisement Messaging Across Media Types," by James D. Barnes, et al., filed May 22, 2006 as U.S. Appl. No. 11/438,540.
Patent Application entitled, "Behavioral Analysis Engine for Profiling Wireless Subscribers," by James D. Barnes, et al., filed Nov. 8, 2006 as U.S. Appl. No. 11/4557,939.
Patent Application entitled, "Method and System for Providing Custom Background-Downloads," by Geoff S. Martin, et al., filed Nov. 16, 2007 as U.S. Appl. No. 11/280,576.
Office Action dated Aug. 15, 2008, U.S. Appl. No. 11/405,195, filed Apr. 17, 2006, 12 pages.
Office Action dated Nov. 3, 2008, U.S. Appl. No. 11/438,450, filed May 22, 2006, 14 pages.
Restriction Requirement dated Jun. 17, 2008, U.S. Appl. No. 11/405,195, filed Apr. 17, 2006, 7 pages.
Patent Application entitled, "Subscriber Data Insertion Into Advertisements Requests," by James D. Barnes, et al., filed Jul. 21, 2006 as U.S. Appl. No. 11/491,387.
Patent Application entitled, "In-Flight Campaign Optimization," by James D. Barnes, et al., filed Nov. 9, 2006 as U.S. Appl. No. 11/558,021.
Patent Application entitled, "Carrier Data Bassed Product Inventory Management and Marketing," by James D. Barnes, et al., filed Dec. 28, 2006 as U.S. Appl. No. 11/617,703.
Patent Application entitled, "Advertisement Inventory Management," by James D. Barnes, et al., filed Oct. 27, 2008 as U.S. Appl. No. 12/259,187.
Office Action dated Feb. 4, 2009, U.S. Appl. No. 11/491,387, filed Jul. 21, 2006, 9 pages.
Final Office Action dated Aug. 6, 2009, U.S. Appl. No. 11/491,387, filed Jul. 21, 2006, 13 pages.
Advisory Action dated Oct. 19, 2009, U.S. Appl. No. 11/491,387, filed Jul. 21, 2006, 4 pages.
Office Action dated Jan. 6, 2010, U.S. Appl. No. 11/558,021, filed Nov. 9, 2006, 7 pages.
Patent application entitled "Method and System for Facilitating Determination of Call-Drop Locations in a Wireless Network," filed Sep. 9, 2003, as U.S. Appl. No. 10/658,353.
Patent application entitled "Seamless Retrieval of Non-Standard Items for a Mobile Device," filed May 12, 2006, as U.S. Appl. No. 11/433,301.
Patent application entitled "Mobile-Device-Based Coupon Management Systems and Methods," filed Apr. 13, 2006, as U.S. Appl. No. 11/403,614.
Patent Application entitled, "Behavioral Analysis Engine for Profiling Wireless Subscribers," by James D. Barnes, et al., filed Nov. 8, 2006 as U.S. Appl. No. 11/557,939
Final Office Action dated Feb. 26, 2009, U.S. Appl. No. 11/405,195, 17 pages.
Advisory Action dated May 7, 2009, U.S. Appl. No. 11/405,195, 2 pages.
Office Action dated Aug. 18, 2009, U.S. Appl. No. 11/405,195, 17 pages.
Office Action dated Feb. 27, 2009, U.S. Appl. No. 11/433,301, filed May 12, 2006, 13 pages.
Notice of Allowance dated Oct. 26, 2009, U.S. Appl. No. 11/433,301, filed May 12, 2006, 7 pages.
Office Action dated Jun. 17, 2008, U.S. Appl. No. 11/403,614, filed Apr. 13, 2006, 7 pages.
Office Action dated Aug. 27, 2008, U.S. Appl. No. 11/403,614, filed Apr. 13, 2006, 11 pages.
Final Office Action dated Mar. 4, 2009, U.S. Appl. No. 11/403,614, filed Apr. 13, 2006, 12 pages.
Advisory Action dated May 7, 2009, U.S. Appl. No. 11/403,614, filed Apr. 13, 2006, 3 pages.
Office Action dated Aug. 20, 2009, U.S. Appl. No. 11/403,614, filed Apr. 13, 2006, 11 pages.
Office Action dated Apr. 28, 2009, U.S. Appl. No. 11/438,540, filed May 22, 2006, 16 pages.
Office Action dated Jul. 10, 2009, U.S. Appl. No. 11/438,540, filed May 22, 2006, 3 pages.
Office Action dated Oct. 16, 2009, U.S. Appl. No. 11/438,540, filed May 22, 2006, 12 pages.
Final Office Action dated Apr. 20, 2010, U.S. Appl. No. 11/438,540, filed May 22, 2006, 26 pages.

(56) References Cited

OTHER PUBLICATIONS

Final Office Action dated Jun. 29, 2010, U.S. Appl. No. 11/558,021, filed Nov. 9, 2006, 28 pages.
Advisory Action dated Jul. 2, 2010, U.S. Appl. No. 11/438,540, filed May 22, 2006, 4 pages.
Final Office Action dated Jan. 13, 2011, U.S. Appl. No. 11/557,939, filed Nov. 8, 2006.
Office Action dated Feb. 8, 2011, U.S. Appl. No. 11/405,195, filed Apr. 17, 2006.
Office Action dated Aug. 30, 2010, U.S. Appl. No. 11/557,939, filed Nov. 8, 2006, 52 pages.
Advisory Action dated Sep. 22, 2010, U.S. Appl. No. 11/558,021, filed Nov. 9, 2006, 3 pages.
Office Action dated Oct. 14, 2010, U.S. Appl. No. 11/438,540, filed May 22, 2006.
Office Action dated Sep. 30, 2010, U.S. Appl. No. 11/617,703, filed Dec. 28, 2006.
Final Office Action dated Oct. 27, 2010, U.S. Appl. No. 11/405,195, filed Apr. 17, 2006.
Final Office Action dated Nov. 8, 2010, U.S. Appl. No. 11/403,614, filed Apr. 13, 2006.
Examiner's Answer dated Nov. 8, 2010, U.S. Appl. No. 11/491,387, filed Jul. 21, 2006.
Patent Application entitled "Seamless Retrieval of Non-Standard Items for a Mobile Device," by James D. Barnes, et al., filed Jan. 12, 2010, as U.S. Appl. No. 12/686,188.
Examiner's Answer dated Aug. 26, 2014, U.S. Appl. No. 11/558,021, filed Nov. 9, 2006.
Office Action dated Aug. 5, 2014, U.S. Appl. No. 11/557,939, filed Nov. 8, 2006.
Final Office Action dated May 27, 2014, U.S. Appl. No. 12/259,187, filed Oct. 27, 2008.
Advisory Action dated Aug. 6, 2014, U.S. Appl. No. 12/259,187, filed Oct. 27, 2008.
Notice of Allowance dated Aug. 1, 2012, U.S. Appl. No. 11/617,703, filed Dec. 28, 2006.
Connelly, Francis J., et al., "The Life Cycle Concept as a Long Term Forecasting Model", Academy of Marketing Journal (pre-1986); pp. 455-464, Summer 1974, 2, 3, ABI/INFORM Global.
Fisher, Marshall, et al., Accurate Retail Testing of Fashion Mechandise: Methodology and Application, Marketing Science, vol. 19, No. 3, pp. 266-278, Summer 2000, ABI/INFORM Global.
Kurawarwala, Abbas A., et al., "Forecasting and Inventory Management of Short Life-Cyle Products", Operations Research, vol. 44, No. 1, Jan.-Feb. 1996, pp. 131-150, INFORMS.
Stratman, Scott, "Allstockedup", Industrial Distribution, vol. 89, No. 11, Nov. 2000, pp. 92-96, ABI/INFORM Global.
Vijayan, Jaikumar, "IBM Service Follows Products After Delivery", Computerworld, vol. 35, No. 28, p. 14, Jul. 9, 2001, ABI/INFORM Global.
Notice of Allowance dated Dec. 6, 2012, U.S. Appl. No. 11/405,195, filed Apr. 17, 2006.
Office Action dated Dec. 3, 2012, U.S. Appl. No. 11/403,614, filed Apr. 13, 2006.
Decision on Appeal dated Oct. 9, 2012, U.S. Appl. No. 11/491,387, filed Jul. 21, 2006.
Notice of Allowance dated Jan. 8, 2013, U.S. Appl. No. 11/491,387, filed Jul. 21, 2006.
Office Action dated Apr. 6, 2012, U.S. Appl. No. 11/405,195, filed Apr. 17, 2006.
Advisory Action dated Feb. 29, 2012, U.S. Appl. No. 12/259,187, filed Oct. 27, 2008.
Advisory Action dated Aug. 22, 2013, U.S. Appl. No. 11/403,614, filed Apr. 13, 2006.
Office Action dated Oct. 31, 2013, U.S. Appl. No. 11/557,939, filed Nov. 8, 2006.
Final Office Action dated Dec. 26, 2013, U.S. Appl. No. 11/558,021, filed Nov. 9, 2006.
Advisory Action dated Feb. 20, 2014, U.S. Appl. No. 11/558,021, filed Nov. 9, 2006.

Office Action dated Dec. 6, 2013, U.S. Appl. No. 12/259,187, filed Oct. 27, 2008.
Final Office Action dated Jun. 10, 2013, U.S. Appl. No. 11/403,614, filed Apr. 13, 2006.
Office Action dated Jun. 13, 2013, U.S. Appl. No. 11/558,021, filed Nov. 9, 2006.
Decision on Appeal dated Apr. 28, 2015, U.S. Appl. No. 11/438,540, filed May 22, 2006.
Final Office Action dated Mar. 2, 2015, U.S. Appl. No. 11/557,939, filed Nov. 8, 2006.
Examiner's Answer dated Mar. 12, 2015, U.S. Appl. No. 12/259,187, filed Oct. 27, 2008.
FAIPP Pre-Interview Communication dated Apr. 3, 2015, U.S. Appl. No. 14/150,832, filed Jan. 9, 2014.
Thierer, et al., "Privacy Solutions (Part 2): Adblock Plus," Technology Liberation Front, Sep. 8, 2008, on line at techliberation.com.
Burcham, Robert H., et al., entitled "IP Address Hashing in Advertisement Gateway," filed on Jan. 21, 2014, U.S. Appl. No. 14/160,196.
Burcham, Robert H., et al., entitled "Client Mediation and Integration to Advertisement Gateway," filed on Jan. 2014, U.S. Appl. No. 14/160,206.
Burcham, Robert H., et al., entitled "Address Modification for Advertisement Mediation," filed on Jan. 21, 2014, U.S. Appl. No. 14/160,215.
Burcham, Robert H., et al., entitled "Advertisement Mediation of Supply-Demand Communications," filed on Jan. 21, 2014, U.S. Appl. No. 14/160,224.
Delker, Jason R., et al., entitled, "Enhanced Dialer for a Mobile Communication Device," filed Mar. 4, 2015, U.S. Appl. No. 14/639,057.
Ferrante, Piero D., et al., entitled, "System and Method for Subscriber Cluster Synthesis," filed Feb. 11, 2015, U.S. Appl. No. 14/619,689.
Notice of Allowance dated Jan. 28, 2016, U.S. Appl. No. 14/024,629, filed Sep. 11, 2013.
FAIPP Pre-Interview Communication dated Apr. 15, 2016, U.S. Appl. No. 13/911,074, filed Jun. 5, 2013.
FAIPP Pre-Interview Communication dated Feb. 16, 2016, U.S. Appl. No. 14/245,822, filed Apr. 4, 2014.
Foreign Communication from a Related Counterpart—Preliminary Report on Patentability dated Mar. 24, 2016, PCT/US14/54877, filed on Sep. 10, 2014.
Hannebaum, Ryan K., et al., entitled, "Advertisement Campaign Target Selection Engine," filed Apr. 4, 2014, U.S. Appl. No. 14/245,822.
Final Office Action dated May 3, 2016, U.S. Appl. No. 11/557,939, filed Nov. 8, 2006.
Restriction Requirement dated May 19, 2016, U.S. Appl. No. 14/024,627, filed Sep. 11, 2013.
Office Action dated May 17, 2016, U.S. Appl. No. 14/150,832, filed Jan. 9, 2014.
First Action Interview Office Action dated Apr. 28, 2016, U.S. Appl. No. 14/245,822, filed Apr. 4, 2014.
Office Action dated Jul. 1, 2016, U.S. Appl. No. 14/165,569, filed Jan. 27, 2014.
Office Action dated Jul. 14, 2016, U.S. Appl. No. 14/165,571, filed Jan. 27, 2014.
FAIPP Pre-Interview Communication dated Sep. 18, 2015, U.S. Appl. No. 14/494,601, filed Sep. 24, 2014.
Final Office Action dated Apr. 28, 2016, U.S. Appl. No. 14/494,601, filed Sep. 24, 2014.
Notice of Allowance dated Jul. 22, 2016, U.S. Appl. No. 14/494,601, filed Sep. 24, 2014.
Wikipedia, "Foursuare," https://en.wikipedia.org/w/index.php?title=Foursquare&oldid=681836736, Mar. 2009, last accessed on Sep. 25, 2015.
Burcham, Robert H., et al., entitled "Swipe Screen Advertisement Metrics and Tracking," filed Nov. 27, 2013, U.S. Appl. No. 61/910,001.
Burcham, Robert H., et al., entitled "Swipe Screen Advertisement Metrics and Tracking," filed on Jan. 27, 2014, U.S. Appl. No. 14/165,569.
Delker, Jason R., et al., entitled "Ad Management Using Ads Cached on a Mobile Electronic Device," filed on Nov. 27, 2013, U.S. Appl. No. 61/910,002.

(56) References Cited

OTHER PUBLICATIONS

Delker, Jason R., et al., entitled "Ad Management Using Ads Cached on a Mobile Electronic Device," filed on Jan. 27, 2014, U.S. Appl. No. 14/165,571.
Belser, John E., et al., entitled "End User Participation in Mobile Advertisement," filed Sep. 24, 2014, U.S. Appl. No. 14/494,601.
FAIPP Pre-Interview Communication dated Sep. 9, 2016, U.S. Appl. No. 14/024,627, filed Sep. 11, 2013.
Notice of Allowance dated Oct. 24, 2016, U.S. Appl. No. 14/024,627, filed Sep. 11, 2013.
Final Office Action dated Oct. 14, 2016, U.S. Appl. No. 14/150,832, filed Jan. 9, 2014.
Barnes, James D., et al., entitled, "Behavioral Analysis Engine for Profiling Wireless Subscribers," filed Aug. 3, 2016, U.S. Appl. No. 15/227,950.
Notice of Allowance dated Jul. 16, 2015, U.S. Appl. No. 11/438,540, filed May 22, 2006.
FAIPP Pre-Interview Communication dated Sep. 23, 2015, U.S. Appl. No. 13/956,367, filed Aug. 1, 2013.
FAIPP Office Action dated Jul. 2, 2015, U.S. Appl. No. 14/150,832, filed Jan. 9, 2014.
Sterling, Greg, "Google Replacing "Android ID" with"Advertising ID" Similar to Apple's IDFA," http://marketingland.com/google-replacing-android-id-with-advertising-id-similar-to-apples-idfa-63636, posted Oct. 31, 2013.
Janssen, Cory, "Identifier for Advertisers (IFA)," http://www.techopedia.com/definition/29032/identifier-for-advertisers-ifa-ifda, Apr. 3, 2014, last accessed Feb. 10, 2015.
The iPhone Wiki, "UDID," http://theiphonewiki.com/wiki/UDID, Apr. 3, 2014, last accessed Feb. 10, 2015.
Google Developer Android, "Advertising ID," http://developer.android.com/google/play-services/id.html, Apr. 3, 2014, last accessed Feb. 10, 2015.
Wikipedia, "Real-time Bidding," http://en.wikipedia.org/wiki/Real-time_bidding, Apr. 3, 2014, last accessed Feb. 10, 2015.
Reynolds, Kevin, "Are Ad Exchanges and Real Time Bidding the Next Big Thing?," http://www.advertisingperspectives.com/adblog/media-activation/are-ad-exchanges-and-real-time-bidding-the-next-big-thing/, Apr. 3, 2014, last accessed Feb. 10, 2015.
Foreign Communication from a Related Counterpart—International Search Report and Written Opinion, dated Dec. 24, 2014, PCT/US14/54877, filed on Nov. 11, 2014.
Burcham, Robert H., et al., entitled "System and Method for Identifying a Mobile Device with Near Real Time Visualization to Action," filed Sep. 11, 2013, U.S. Appl. No. 14/024,627.
Burcham, Robert H., et al., entitled "System and Method to Generate an Abstract Advertisement Campaign Management and Implement Policy Enforcement," filed Sep. 11, 2013, U.S. Appl. No. 14/024,629.
Burcham, Robert H., et al., entitled "System and Method to Generate an Abstract Advertisement Campaign Management and Implement Policy Enforcement," filed Sep. 10, 2014, PCT Application Serial No. PCT/US2014/054877.
Burcham, Robert H., et al., entitled "Methods and Systems of Generating a Unique Mobile Device Identifier," filed Aug. 1, 2013, U.S. Appl. No. 13/956,367.
Holmes, Geoffrey A., entitled "Methods and Systems of Collecting and Segmenting Device Sensor Data for Mobile Device Identification," filed Jun. 5, 2013, U.S. Appl. No. 13/911,074.
Belser, John E., et al., entitled "Ad Management Using Ads Cached on a Mobile Electronic Device," filed Jan. 9, 2014, U.S. Appl. No. 14/150,832.
Katzer, Robin D., et al., entitled "Advertisement Dynamic Queue Management," filed Apr. 10, 2014, U.S. Appl. No. 14/250,381.
Burcham, Robert H., et al., entitled "Categorization of Unknown Variables in a Target Information Database," filed Nov. 4, 2014, U.S. Appl. No. 14/532,969.
Bell, Timothy L., et al., entitled "Method for Consumer Profile Consolidation Using Mobile Network Identification," filed Oct. 20, 2014, U.S. Appl. No. 14/518,504.
Arivukkarasu, Anand, et al., entitled "Telecom Services to Support Retail Fuel Stocking Logistics," filed Nov. 12, 2014, U.S. Appl. No. 14/539,715.
Advisory Action dated May 18, 2015, U.S. Appl. No. 11/557,939, filed Nov. 8, 2006.
Office Action dated Dec. 17, 2015, U.S. Appl. No. 11/557,939, filed Nov. 8, 2006.
FAIPP Pre-Interview Communication dated Nov. 18, 2015, U.S. Appl. No. 14/024,629, filed Sep. 11, 2013.
Notice of Allowance dated Dec. 16, 2015, U.S. Appl. No. 13/956,367, filed Aug. 1, 2013.
Final Office Action dated Oct. 29, 2015, U.S. Appl. No. 14/150,832, filed Jan. 9, 2014.
Advisory Action dated Jan. 7, 2016, U.S. Appl. No. 14/150,832, filed Jan. 9, 2014.
First Action Interview Office Action dated Dec. 17, 2015, U.S. Appl. No. 14/494,601, filed Sep. 24, 2014.
FAIPP Office Action dated Dec. 4, 2017, U.S. Appl. No. 14/619,689, filed Feb. 11, 2015.
Final Office Action dated Dec. 15, 2017, U.S. Appl. No. 14/532,969, filed Nov. 4, 2014.
Final Office Action dated Jan. 18, 2018, U.S. Appl. No. 11/558,021, filed Nov. 9, 2006.
Advisory Action dated Jan. 24, 2018, U.S. Appl. No. 14/532,969, filed Nov. 4, 2014.
Office Action dated Jul. 7, 2017, U.S. Appl. No. 11/558,021, filed Nov. 9, 2006.
Office Action dated Jul. 10, 2017, U.S. Appl. No. 11/403,614, filed Apr. 13, 2006.
FAIPP Office Action dated Jul. 19, 2017, U.S. Appl. No. 14/532,969, filed Nov. 4, 2014.
FAIPP Pre-Interview Communication dated Oct. 4, 2017, U.S. Appl. No. 14/619,689, filed Feb. 11, 2015.
Decision on Appeal dated Apr. 14, 2017, U.S. Appl. No. 12/259,187, filed Oct. 27, 2008.
Notice of Allowance dated Apr. 3, 2017, U.S. Appl. No. 14/150,832, filed Jan. 9, 2014.
FAIPP Pre-Interview Communication dated May 9, 2017, U.S. Appl. No. 14/532,969, filed Nov. 4, 2014.
Notice of Panel Decision from Pre-Appeal Brief Review dated May 15, 2018, U.S. Appl. No. 11/558,021, filed Nov. 9, 2006.
Notice of Allowance dated May 18, 2018, U.S. Appl. No. 11/558,021, filed Nov. 9, 2006.
Office Action dated Jul. 10, 2017, U.S. Appl. No. 14/250,381, filed Apr. 10, 2014.
Fiinal Office Action dated Mar. 27, 2018, U.S. Appl. No. 14/250,381, filed Apr. 10, 2014.
Final Office Action dated Mar. 12, 2018, U.S. Appl. No. 14/619,689, filed Feb. 11, 2015.
FAIPP Pre-Interview Communication dated Oct. 29, 2018, U.S. Appl. No. 15/227,950, filed Aug. 3, 2016.
First Action Interview Office Action dated Dec. 19, 2018, U.S. Appl. No. 15/227,950, filed Aug. 3, 2016.
Final Office Action dated Nov. 8, 2018, U.S. Appl. No. 14/619,689, filed Feb. 11, 2015.
Advisory Action dated Dec. 27, 2016, U.S. Appl. No. 14/150,832, filed Jan. 9, 2014.
Office Action dated Sep. 5, 2018, U.S. Appl. No. 15/227,950, filed Aug. 8, 2016.
Advisory Action dated Jul. 2, 2018, U.S. Appl. No. 14/250,381, filed Apr. 10, 2014.
Examiner's Answer dated Jul. 27, 2018, U.S. Appl. No. 14/532,969, filed Nov. 4, 2014.
Office Action dated Jun. 28, 2018, U.S. Appl. No. 14/619,689, filed Feb. 11, 2015.
Japanese Office Action dated Aug. 7, 2018, JP Application Serial No. 2016-542051, filed on Jan. 26, 2016.
Notice of Allowance dated Mar. 21, 2019, U.S. Appl. No. 15/227,950, filed Aug. 3, 2016.
Office Action dated Feb. 7, 2019, U.S. Appl. No. 14/250,381, filed Apr. 10, 2014.
Advisory Action dated Feb. 19, 2019, U.S. Appl. No. 14/619,689, filed Feb. 11, 2015.

(56) References Cited

OTHER PUBLICATIONS

Notice of Panel Decision dated Apr. 5, 2019, U.S. Appl. No. 14/619,689, filed Feb. 11, 2015.

* cited by examiner

Table A

| Spot | \multicolumn{12}{c}{Total Predicted Inventory} |
|---|---|---|---|---|---|---|---|---|---|---|---|---|

| Spot | Jan | Feb | Mar | Apr | May | Jun | Jul | Aug | Sep | Oct | Nov | Dec |
|---|---|---|---|---|---|---|---|---|---|---|---|---|
| Cnn.com/page1_top | 1M | 1M | 1M | 1.2M | 1.3M | 1M | 1M | 1.2M | 1M | 1M | 1M | 1M |
| Cnn.com/page1_bot | 1M | 1M | 1M | 1.2M | 1.3M | 1M | 1M | 1.2M | 1M | 1M | 1M | 1M |

Table B

| Spot | Jan | Feb | Mar | Apr | May | Jun | Jul | Aug | Sep | Oct | Nov | Dec |
|---|---|---|---|---|---|---|---|---|---|---|---|---|
| Cnn.com/page1_top | 1M | 700K | 600K | 500K | 400K | 300K | 200K | 100K | 0 | 0 | 0 | 0 |
| Cnn.com/page1_bot | 1M | 700K | 600K | 500K | 400K | 300K | 200K | 100K | 0 | 0 | 0 | 1M |

Reserved Inventory

Table C

| Spot | Jan | Feb | Mar | Apr | May | Jun | Jul | Aug | Sep | Oct | Nov | Dec |
|---|---|---|---|---|---|---|---|---|---|---|---|---|
| Cnn.com/page1_top | 0 | 300K | 400K | 700K | 900K | 700K | 800K | 1.1M | 1M | 1M | 1M | 1M |
| Cnn.com/page1_bot | 0 | 300K | 400K | 700K | 900K | 700K | 800K | 1.1M | 1M | 1M | 1M | 1M |

Remaining Available Inventory

Table D

Available Inventory (for a month)

| Target | Spot | 5AM | 6AM | 7AM | 8AM | 9AM | 10AM | 11AM | ..... |
|---|---|---|---|---|---|---|---|---|---|
| 18-35M | Cnn.com/page1_top | 5K | 7K | 10K | 15K | 25K | 25K | 20K | ..... |
| 18-35F | Cnn.com/page1_top | 3K | 4K | 8K | 10K | 10K | 15K | 15K | ..... |
| 18-35M | Cnn.com/page1_top | 5K | 7K | 10K | 15K | 25K | 25K | 20K | ..... |
| 18-35F | Cnn.com/page1_top | 3K | 4K | 8K | 10K | 10K | 15K | 15K | ..... |
| 35+ F | Cnn.com/page1_top | 3K | 4K | 8K | 10K | 10K | 15K | 15K | ..... |
| 35+ M | Cnn.com/page1_top | 2K | 3K | 7K | 8K | 9K | 10K | 12K | |
| 35+ F | Cnn.com/page2_top | 3K | 4K | 8K | 10K | 10K | 15K | 15K | ..... |
| 35+ M | Cnn.com/page2_top | 2K | 3K | 7K | 8K | 9K | 10K | 12K | |

FIG. 4

INVENTORY MANAGEMENT INTEGRATING SUBSCRIBER AND TARGETING DATA

CROSS-REFERENCE TO RELATED APPLICATIONS

This application includes subject matter related to the following applications, which is hereby incorporated by reference: U.S. patent application Ser. No. 11/405,195, filed Apr. 17, 2006, entitled "Dynamic Advertising Content Distribution and Placement Systems and Methods," by James Barnes, et al.

BACKGROUND

Advertising and marketing executives are constantly focused on reaching customers in new and innovative ways. With the widespread use of wireless communication devices and continuous advances in handset technology, previously untapped new avenues of advertising are becoming readily available. Because of the breadth of varying technology in handsets, the many types of media, and the lack of infrastructure to support advertising in the wireless world (compared to, for example, the internet or television advertising), tools in the form of both software and hardware are needed to most efficiently and effectively manage advertising content and campaigns in the new mobile avenues for advertising. Given that the potential opportunities for advertising number in the millions for many carriers, there is a need to manage inventory, i.e., opportunities available for advertising in the mobile environment.

SUMMARY

Systems and methods for inventory management integrating subscriber and targeting data are provided. Some method embodiments include tracking a historical inventory during a first time period. The inventory includes, for each of a plurality of advertising spots, a number of impressions for each spot, said impressions being categorized by segment. The method also includes predicting a future inventory available for a second time period based on the tracked inventory for the first time period. The method additionally includes subtracting, on a segment-by-segment basis, inventory that is sold from the future inventory.

According to some system embodiments, an inventory management unit integrating subscriber and targeting data is provided. The inventory management unit includes an events data store that records event data for a plurality of events, the event data including a subscriber id and behavior by that subscriber. The inventory management unit also includes a subscriber data store that records subscriber data for a plurality of subscribers, the subscriber data including a subscriber id and demographic information on that subscriber. The inventory management unit includes a segmentation engine that segments the subscriber data into a plurality of segments. The inventory management unit further includes an inventory calculator that predicts inventory in each of the plurality of segments for future time periods based on the recorded event data and recorded subscriber data. The inventory calculator further tracks sold and available portions of the predicted inventory in each segment. The inventory management unit also includes an inventory manager that subtracts from predicted inventory the inventory that is sold.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following description, taken in connection with the accompanying drawings, wherein like reference numerals represent like parts.

FIG. 4 an illustrative report generated by the inventory reporter according to various embodiments of the present disclosure.

DETAILED DESCRIPTION

Figure 1:
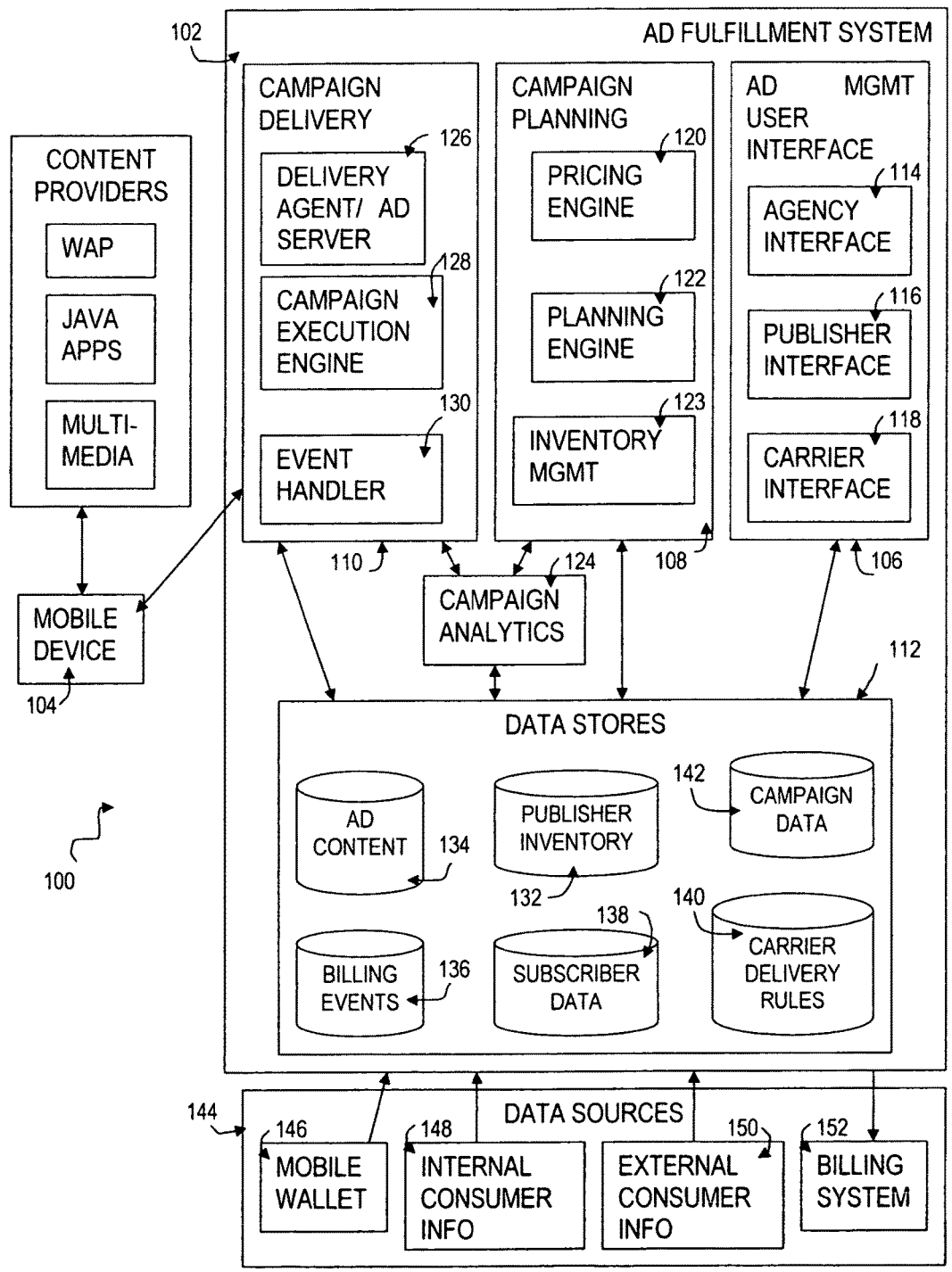
FIG. 1 is a block diagram of a high-level architecture for a system according to various embodiments of the present disclosure.

It should be understood at the outset that although an illustrative implementation of various embodiments is provided below, the present system may be implemented using any number of techniques, whether currently known or not yet in existence. The present disclosure should in no way be limited to the illustrative implementations, drawings, and techniques described below.

With new avenues of advertising opening in the mobile device environment, the systems and methods of the present disclosure provide an infrastructure for implementing and managing advertising campaigns. The system of the present disclosure provides the hardware and software for managing a large inventory of available advertising "spots" in the mobile environment, thereby enabling realistic planning and sales for targeted advertising campaigns. The methods of the present disclosure disclose identifying quantities of inventory available and managing sales for advertising campaigns at a fine-grained level using subscriber and targeting data.

In other proposed inventory management systems, such as those used for other advertising media like television and radio, inventory may be projected for a segment of time or a particular channel, but may not be segmented down to the level of individual consumers. For advertising media such as the Internet, inventory may be segmented to the level of the individual consumer, however, internet advertising publishers are not in a position to confirm delivery of advertising to a specific consumer, and thus confirm segmented data in the manner as can a telecommunications carrier. The carrier is in a unique position to segment inventory down to the level of the individual consumer, because the carrier has access to more detailed information about each of its subscribers demographically and behaviorally than, for comparison, an internet services provider or television channel provider who commonly sell advertising spots.

The following disclosure is divided into six sections including this overview. Section II defines terminology used in this disclosure. Section III describes in detail a novel advertising framework that provides context and support for the inventory management methods disclosed in the sections IV and V. Section VI describes a general purpose computer on which the systems and methods of the present disclosure may be implemented.

As used herein, the term "carrier" refers to a telecommunications company that provides communication services for a mobile device under a subscriber agreement.

As used herein, the term "publisher" refers to the companies that provide the mechanism to display advertisements. For example, a publisher could be a wireless application protocol (WAP) tent provider, a multmedia content provider, or a JAVA application provider. Specifically, publishers are content providers.

As used herein, the term "impressions" refers to the number of instances that any given advertisement has been displayed, or the number of instances of display desired.

As used herein, the term "spots" refers to an available instance in a WAP page, an application, splash screen or white space in which an advertisement may be displayed. A spot, in this context of advertising in a mobile device, is analogous to the use of the term "spot" to refer to an available instance for a commercial on television or radio between major programs. Just as "spots" may be sold for advertising on television during the a sporting event such as the Superbowl or during a popular program, spots may be sold for advertising in applications, white spaces, and splash screens in a mobile device.

As used herein, the term "inventory" refers to the overall quantity and identity of spots available for sale for display of advertising. The total inventory may be defined by the number of available spots multiplied by the number of impressions per spot.

As used herein, the term "segment" refers to a portion of the inventory divided from other portions according to demographic or behavioral groupings. For example, the inventory may be divided into segments according to gender, marital status, and age. In various embodiments, a subscriber may be assigned to one and only one segment. Segments may be used as targeting criteria in planning an advertising campaign to reach subscribers in identifiable groups.

As used herein, the term "targeting information" refers to input criteria that identify an individual or group of individual mobile device users that are to be targeted in an advertising campaign.

As used herein, the term "media type" refers to how, technologically, a given advertisement is displayed. For example, the media type may indicate whether a given advertisement is displayed via a WAP page, through a multi-media player, or embedded within a JAVA application.

As used herein, the term "category" refers to the types of products or services being advertised in a given advertisement (e.g., travel, groceries, sports & outdoors, name brand consumer goods, etc.).

Various different media types may be used for advertising in mobile devices. For instance, WAP pages are a media type similar to internet web pages, but formatted in Wireless Application Protocol, a protocol created for mobile devices such as PDAs and mobile phones, designed to give users a richer data application experience that would enable "access to the Internet" through mobile devices. WAP pages may be the source of advertising inventory in the sense that ad banners or ad text may be added to web pages. Such ad banners or texts may, in various embodiments, be interactive (e.g., click-to-call, click-to-coupon, click-to-URL, etc.).

Short Message System ("SMS") is a service available on most digital mobile phones that permits the sending of short messages (also known as text messages, messages, or more colloquially SMSes, texts or even txts) between mobile phones, other handheld devices. SMS messages are a media type used for advertising inventory (i.e., push technology instead of pull technology such as WAP pages, since messages can be pushed to a mobile device without subscriber initiation). SMS messages may be used to selectively push advertisements, or alternatively, they could be used as a result of a subscriber interaction with an advertisement elsewhere (such as, for example, when the user clicks on a banner advertisement to register for a contest, an SMS message could be pushed to send an entry notification to the user).

Multimedia content are another media type. Multimedia content includes content that is played on a media player on the handset, similar to playing audio/video using Microsoft Media Player or Apple's QuickTime Pro on a computer. Multimedia content may be either "on demand" or "live content." In on demand content, a video clip of a predetermined length is played. In the case of on demand content, an advertisement may be played before the requested clip (pre-roll), during the requested clip, or after the requested clip (post-roll). In the case of live content, the content is streamed and plays as long as the user permits the media player to play it. Similar to regular television, advertisements may be inserted into the stream. In various embodiments, there are both national and local ad spots.

Searches, as a subset of WAP pages, are still another media type for advertising in the sense that a user may enter keywords in a search, and the keywords may be utilized in targeting advertisements. For instance, if a user entered into a search the keywords "bed frames," advertisements for local mattress stores may be triggered based on context. Search engines enable contextual targeting with the user of the mobile device providing in the search string things of interest to her.

A directory application may provide still another media type in the sense that directory applications are a subset of JAVA applications, and advertisements may be served up in any type of JAVA application. In a type of directory application that gives directions, advertisements relevant to locations along the direction route may be placed in the application along with the directions. Similarly advertisements may be displayed in a web page application providing directory assistance.

Location based services ("LBS") and applications are another media type in the sense that in JAVA applications, a particular advertisements may be served up in response to a determination of the location of the mobile device.

Start-up/shut-down of J2ME applications are an additional media type in the sense that they offer additional locations within a java application where advertisements may be placed. In addition to placing advertisements at the startup and shutdown of a java application, advertisements may be embedded within an application itself as it runs on the mobile device. For example, in an application for a race car game, an advertisement may be displayed in a road sign graphic in the game or at the bottom of a game where white space is available next to the score, the timer, etc.

FIG. 1 is a block diagram of a high-level architecture for a system 100 for advertising management. Embodiments of this architecture are described in more detail in related U.S. application Ser. No. 11/405,195, filed Apr. 17, 2006, 2006, entitled "Dynamic Advertising Content Distribution and Placement Systems and Methods," by James Barnes, et al. The system 100 generally encompasses the advertisement fulfillment system 102 of a carrier and a mobile device 104 that subscribes to and is associated with the carrier. The details of the mobile device 104 are not particularly relevant to the present disclosure and thus are not handled in great detail herein. Typically, a mobile device 104 will be associated with a particular carrier with whom the user has contracted as a subscriber for services.

The advertisement fulfillment system 102 comprises an advertisement management user interface 106, a campaign planning unit 108, a campaign delivery unit 110, and data stores 112. The advertisement management user interface 106 interfaces with the various users, and includes an interface for each type of user, such as an agency interface 114 for one or more advertisement agencies, a publisher interface 116 for one or more publishers, and a carrier interface 118 for the carrier for the advertisement fulfillment system. Through the agency interface 114, advertisement agencies may create advertising campaigns, supply advertisements, view the inventory, and view reports. Through the publisher interface 116, publishers may add inventory, receive advertisement Application Program Interfaces ("APIs") and view reports. Similarly, through the carrier interface 118, the carrier may rate and price advertisements, generate delivery rules for advertisements, validate the advertisements, and view reports.

The campaign planning unit 108 comprises various engines, which may be implemented in hardware, software, or a combination of hardware and software. Specifically, the campaign planning unit 108 comprises a pricing engine 120, a planning engine 122, and an inventory management unit 123. The campaign planning unit 108 is operably linked to the data stores 112 such that data in the various data stores 112 may be utilized by the pricing engine 120, the planning engine 122, and the inventory management unit 123.

The pricing engine 120 facilitates the definition of pricing rules by the carrier. Within a given campaign, pricing may vary and be dependent on various factors. One factor that may affect pricing is the time the advertisement is served. Another factor that may affect pricing is the available inventory (based on supply and demand). Yet another factor that may affect pricing is the industry in which the advertisement will stimulate interest (for example, an automobile is worth more than a cup of coffee). Another factor that may affect pricing is which particular event causes an advertisement to be displayed (i.e., click-to-call when the user of the mobile device presses a button to make a call vs. click-to-URL when the user of the mobile device presses a button to connect to a particular website). Still another factor that may affect pricing is the channel by which the advertisement is broadcast (i.e., the media type—WAP and multimedia advertisements have different costs). Other factors that may affect pricing are the location of the device and whether targeting is used to determine which advertisement is displayed.

The planning engine 122 is the primary component of the campaign planning unit 108. The planning engine 122 interfaces between the other components to facilitate the campaign definition process. The planning engine 122 supports the various users as described above, namely the advertisement agency, publisher, and carrier. The functionality provided by the planning engine 122 for each of these users is discussed in turn below.

For the advertisement agency user, the planning engine 122 facilitates advertisement and campaign management by enabling the advertisement agency user to add, view, update, and delete advertisements, and define campaigns. A campaign definition defined by the advertisement agency user with the planning engine 122 may, in various embodiments, include the following criteria: the campaign start date, the campaign end date, a number of impressions, a number of subscribers targeted by the campaign, advertisements, spots, a mapping of each advertisement to a spot, segments targeted by the campaign, targeting criteria, and pricing. In various embodiments, the targeting criteria may include, for example, demographic segments such as age, gender, marital status, income level, whether the user has children, and educational level. In various embodiments, the targeting criteria may include, for example, behavioral segments (i.e., sports, music, or travel preferences), or location of the subscriber (based on the subscriber zip code or a GPS location). In various embodiments, the targeting criteria may include, for example, search keywords. In various embodiments, the planning engine supports the dynamic addition and deletion of targeting criteria such as those described herein.

As will be discussed below with respect to components of the analytics engine 124 regarding campaign modeling and planning optimization, the advertisement agency user can input a segment to target, and components of the analytics engine 124 will generate the remainder of the criteria necessary to meet the criteria that was specified. In various embodiments, the advertisement agency user may vary any of the above targeting criteria, and as a result, the analytics engine 124 recommends values for the non-varied criteria.

For the publisher user, the planning engine 122 provides spot definition a media type and category for each spot, or available time for advertising), and enables the publisher user to manually specify available inventory over different timeframes (i.e., inventory available per day, month, and the like). The planning engine also enables the publisher user to obtain the executable code (such as WAP or JAVA instructions) used to insert advertisements into available spots.

For the carrier user, the planning engine 122 provides the ability to define carrier rules. Carrier rules may include, for example, frequency capping, advertisement restrictions (competitive exclusion, language), and campaign weighting and priority. The planning engine 122 further provides the carrier user with the ability to manually overwrite or set the campaign priority (i.e., define which advertisements within a campaign have higher priority and should be displayed first), define pricing rules, and start and stop campaigns. For all three types of user, the planning engine 122 is further operable to generate reports with respect to each of the functionalities described above.

The planning engine 122 interfaces with the analytics engine 124 (which will be further described herein below) to specify segments targeted for the campaign, as well as targeting criteria for the campaign, and review the resulting matches. The planning engine 122 may also use the analytics engine 124 to model campaigns for campaign planning.

The planning engine 122 interfaces the inventory management unit 123 to determine the capacity of inventory available for advertisement placement. The planning engine 122 interfaces with the pricing engine 120 to determine the pricing for the campaign being planned based on the targeted segment(s) and inventory being used.

The inventory management unit 123 performs inventory management functions across all different types of media (i.e., WAP, multimedia etc). The inventory management unit 123 receives event information from the event handler 130 and accomplishes inventory management by dynamically determining the capacity for a given publishing spot based on previous customer usage and inventory rules. Previous customer usage tracked by the carrier data archiving systems (and stored in subscriber data store 138) may be used by the inventory management unit 123 to predict the available inventory. As one example, additional available inventory may be increased by 20% for Superbowl week over previous weekly averages for a given spot. Initially, prior to obtaining historical customer usage data over at least one period of time, the available inventory across all spots is manually set.

In various embodiments, customer usage data is stored in a table in a Call Detail Records ("CDR") archive. The CDR archive is stored in the subscriber data store 138 that keeps track of subscriber web usage (including visits to URL sites) and Transaction Detail Records ("TDRs"). TDRs are subscriber records of Premium Content Purchase. CDRs and TDRs can be used to conduct behavioral analysis of users of mobile devices in order to target advertisements based on behavior.

Based on which segment of the subscriber base is targeted for a given campaign, other campaign parameters (time/date), and global rules (frequency capping), the inventory management unit 123 determines the relevant inventory on a spot-specific or segment-specific basis.

Figure 2:
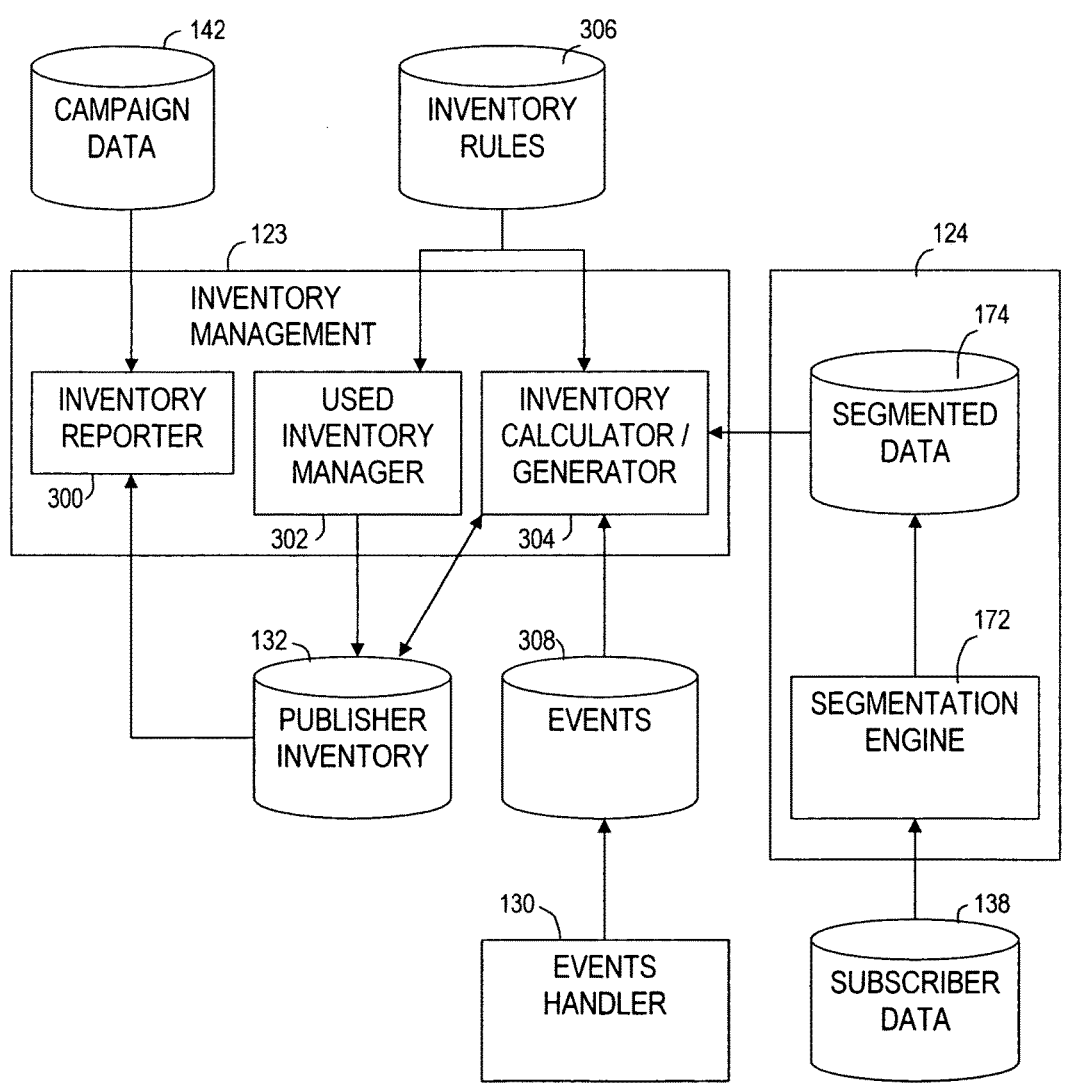
FIG. 2 is a more detailed block diagram of the inventory management unit of the system of FIG. 1 according to various embodiments of the present disclosure.

Referring now to FIG. 2, the inventory management unit 123 is treated in greater detail. The inventory management unit 123 includes an events store 308, an inventory reporter 300, a used inventory manager 302, and an inventory calculator/generator 304.

The events store 308 is a historical log storing events as received by the campaign delivery unit 110 (specifically, the event handler 130). The events store 308 logs information for each advertisement served up (i.e., serving up is an "event") such as, for example, any click-through action responding to the advertisement, the advertisement's identifier, the advertiser's identifier, campaign identifier for the particular campaign of which the advertisement is part, the particular spot to which the advertisement was served, the identifier of the subscriber to whom the advertisement was served, the date and time the advertisement was served, and the like.

As discussed above, the subscriber data store 138 stores subscriber data pertaining to each user that subscribes to the carrier, including subscriber identifiers, demographic data, and a profile for the subscriber based on usage behaviors exhibited by the subscriber.

The segmentation engine 172 (discussed further with respect to FIGS. 3 and 4) uses subscriber data in the subscriber data store 138 and divides and categorizes the data into segments grouped for use by advertisers in targeting campaigns. For example, one form of segmentation may use demographic information from the subscriber data store to group subscribers according to their gender, age and marital status (which will be discussed in further detail below). When subscriber data is segmented by the segmentation engine 172, it is stored in a segmented data store 174. The segments categorize subscribers into groups used by advertisers to target campaigns.

The segmented data store 174 may, in various embodiments, store the segmented data in table format, wherein one column contains the subscriber identifier for each subscriber whose data is treated by the segmentation engine 172, and another column contains an identifier that indicates with which segment (the lowest level segment) the individual subscriber belongs.

Figure 3:
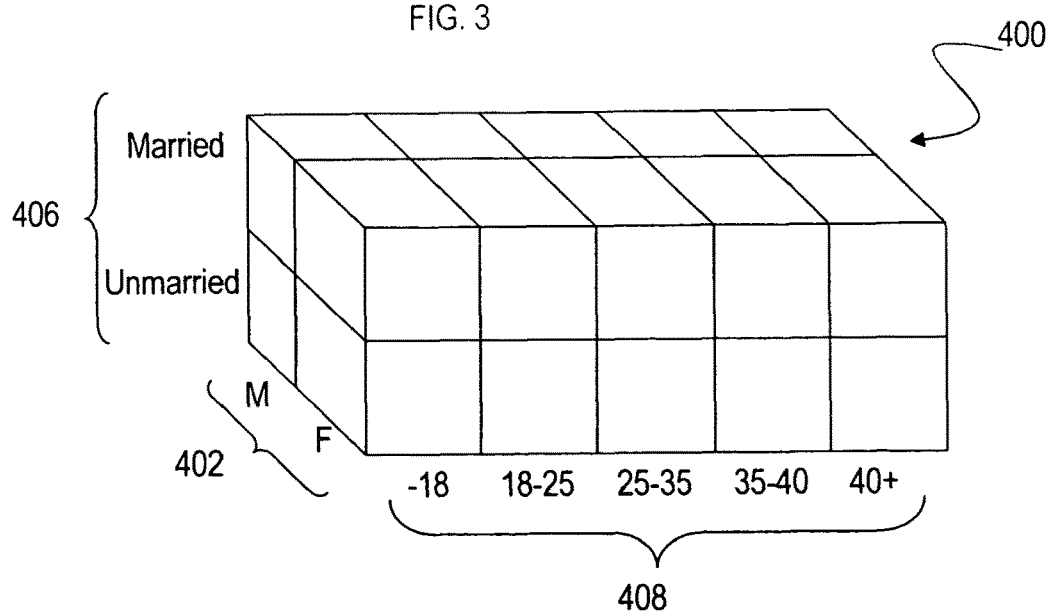
FIG. 3 is a block diagram of segmented inventory treated by the segmentation engine of FIG. 2 according to various embodiments of the present disclosure.

The data stored by the segmented data store 174, and treated by the segmentation engine 172 (discussed more below) is divided into segments for targeting. Referring now to FIG. 3, a block diagram of segmented inventory treated by the segmentation engine 172 is shown. The segmentation engine 172 uses the subscriber data 174 to produce target segments that categorize the raw subscriber data 174 into groups useable by advertisers for targeting. The segmentation engine 172 may divide the raw subscriber data into groups according to any categorization that may be used in advertising including, but not limited to, age, gender, marital status, geographic region, educational status, job categories, how they shop (i.e., online), interests such as sports, travel, news, children, and the like. For example, the total inventory 400 may be first segmented according to gender segments in a first dimension 402 into "Male" and "Female." The total inventory 400 may also be segmented according to marital status in a second dimension 406 into "married" and "unmarried." The total inventory 400 may further be segmented according to ages in a third dimension 408, such as age blocks "ages under 18," "ages 18-25," "ages 25-35," "ages 35-40," and "ages 40 and over." In the embodiment shown by way of example, only three dimensions are shown, however, more or fewer segmentation dimensions and groups within each dimension may be provided.

The raw data used in segmenting may be provided by a subscriber upon contracting with the carrier, provided by the subscriber in a subscriber poll, or gathered by purchasing data from other sources and lining up purchased data with specific subscribers based on certain subscriber identifying information like name, address, or social security number.

It is noted here that the segmentation scheme shown in FIG. 3 partitions the subscribers into disjoint segments, so that a given subscriber can only appear in one segment. This circumstance may be expected for various embodiments using demographic groupings for segmentation. In various embodiments using behavioral groupings for segmentation, any given subscriber in the subscriber data 174 may ultimately fit into several segments. For example, if the total inventory were segmented into sports fans and non sports fans, then segmented according to football fans, baseball fans, and basketball fans, then segmented according to age, a single subscriber might actually fit within each of the segments within sports fans, i.e., may be a fan of football, baseball, and basketball.

Referring back to FIG. 2, the inventory calculator/generator 304 utilizes the events logged in the events store 308 and merges the events with the data from the segmented data store 174 based on the subscriber identifier. Specifically the subscriber identifier is a common factor in both the databases, enabling the inventory calculator/generator 304 to link the information to divide the previously used inventory into segments. With the merged information saved in the publisher inventory store 132, the inventory calculator/generator 304 can use the inventory from the past to predict the quantity of inventory reasonably expected for each segment in the future. Using the event information, the inventory calculator/generator 304 keeps track of inventory sold for each segment to predict inventory expected to be available for that particular segment in the future. The inventory calculator/generator 304 may, in various embodiments, track the inventory sold for a whole month, two months, or even an entire year. The tracked data can then be used by the inventory calculator/generator 304 to forecast inventory for subsequent months or years.

Several forecasting models may be used to predict future available inventory based on inventory already tracked. In one model, a month's worth of inventory is tracked and is used to predict inventory for all months following. Inventory rules indicate how to predict using the single month, by adding, for example, 20% to each target segment for each month to allow for usage growth. As each month passes and inventory for the month has been tracked, the most newly captured month's data is used to update and increase the accuracy of the previously calculated prediction for months still to come.

In another model an entire year's worth of inventory is tracked. The inventory calculator/generator 304 uses a particular month's inventory tracked to forecast inventory for that same month next year (including adjustment as per the inventory rules). For example, inventory is tracked for January 2005, and then used to predict January 2006 inventory. Likewise, the tracked inventory for February 2005 is used to predict the following February's inventory. Each month, forecasted inventory numbers may be updated for each target segment based on what has been tracked.

The used inventory manager 302 manages the inventory available for sale by maintaining a reserved inventory table. When an advertising campaign commits a number of impressions as sold or reserved, the used inventory manager 302 updates the reserved impressions for each targeting segment involved in the campaign based on campaign parameters, such as the impressions bought, target segments, time of day, and the like. Specifically, if impressions are sold for a campaign targeting the segment for unmarried females, aged 25 and over, the number of impressions sold may be subtracted from the total number of impressions that had been available from the total inventory. If impressions are sold for a campaign targeting the segment generally for all women, then the number of impressions sold may be subtracted in equal numbers from each of the lowest level segment (which will be explained in more detail below), or proportionately subtracted from each of the lowest level segment based on the number of impressions available.

The publisher inventory data store 132 contains inventory populated and maintained by the inventory calculator/generator 304 and the used inventory manager 302. The inventory data store 132, in various embodiments, maintains at least two data categories for each segment—one of predicted inventory in each targeting segment and another for the reserved inventory in each targeting segment. In various embodiments, a separate table for historical and predicted available inventory and historical and predicted reserved inventory may be maintained for each month of the year, each of which is updated as new tracked inventory data is received.

The inventory rules store 306 contains rules that are applied to get the predicted total inventory from the available inventory, and to allocate the reserved/sold inventory. An example of an inventory rule is increasing the predicted total/available inventory for a given month by a certain percentage. For example, based on expected growth in usage, when the amount of inventory is predicted for a given month, the amount of inventory is then increased by 10%.

Another example of an inventory rule is a rule applied to the reserved/sold inventory to distribute the number of impressions reserved or sold for a high level segment over the lower level segments. For example, when a number of impressions are sold to target a high level segment such as all married men, the rule governs distribution of the number of impressions over the lower level segments, such as evenly dividing the purchased number of impressions over the age groups or apportioning the purchased number of impressions according to the available impressions for the lower level segments.

The inventory reporter 300 provides information relating to the available predicted or reserved inventory to any other component as required. The inventory reporter 300 obtains information relating to campaigns from the campaign data store 142 (including, for example, campaign start and end dates, segments targeted by the campaign, the time of day, location(s), spots selected, and the like). The inventory reporter 300 obtains inventory rules from the inventory rules database 306 such as, for example, increasing the inventory level for particular dates, such as during holidays or sporting events. The inventory reporter 300 then uses the information relating to the campaigns and the inventory rules to report the predicted inventory. While reporting predicted inventory, the inventory reporter 300 subtracts the reserved inventory from the total available inventory.

As shown in FIG. 4, a report generated by the inventory reporter 300 may be presented in tabular form, breaking down the total predicted inventory (Table A), reserved inventory (Table B), and remaining available inventory (Table C) on a month-by-month basis. Each of the tables Table A, Table B, and Table C do not provide insight into the finer-grain inventory available in the present system, however, by selecting any given month from each of Tables A, B, and C, the user may drill through to a more detailed view. For example, by clicking on a given month in Table C, the user drills through to a more detailed view of Table D. Table D breaks down the remaining inventory for a month according to impressions available per hour of the day and per segment. Using the report of Table D, an advertiser may select fine-grain segments to target specific demographic groups by segment, specific times of day, and specific behavioral groups by spot.

Figure 5:
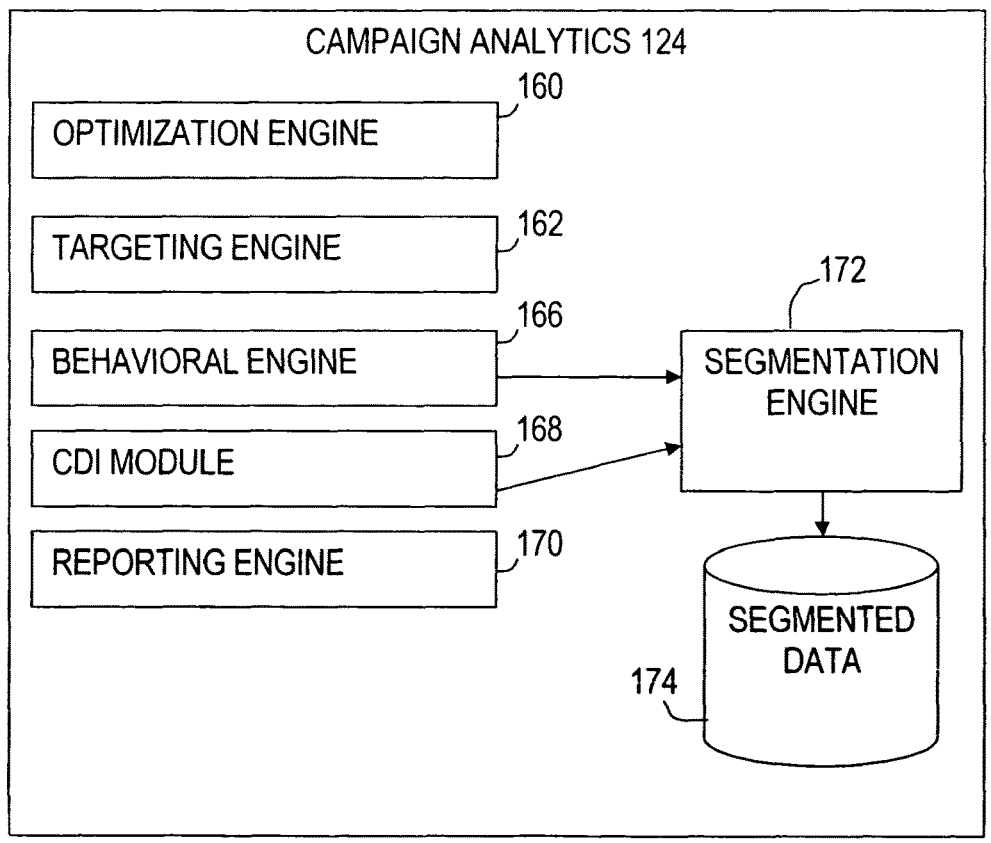
FIG. 5 is a more detailed block diagram of the campaign analytics engine of the system of FIG. 1 according to various embodiments of the present disclosure.

As shown in FIG. 1, another component of the advertisement fulfillment system 102 is the campaign analytics unit 124. The campaign analytics unit 124 is the "brain" of the advertisement fulfillment system 102. The campaign analytics unit 124 contains the data and intelligence to enable planning and execution of campaigns that meet the requirements needed to target highly relevant advertisements to subscribers. The campaign analytics unit 124 includes various components (as shown in FIG. 5), including an optimization engine 160, a targeting engine 162, a behavioral engine 166, customer data integration ("CDI") 168, a reporting engine 170, and a segmentation engine 172.

The optimization engine 160 of the campaign analytics unit 124 optimizes in-progress campaigns. The optimization engine 160 receives feedback on in-progress campaigns via the event handler 130 (FIG. 1), and modifies or optimizes the in-progress campaigns based on campaign optimization rules. In various embodiments, examples of campaign optimization rules include promoting particular spots or particular advertisements that are performing better than others, or prioritizing a particular campaign lagging behind in number of impressions.

The targeting engine 162 of the campaign analytics unit 124 provides one-to-one targeting at the subscriber level for campaigns. Two types of targeting are supported: demographic targeting and behavioral targeting. The targeting engine 162 processes the data provided by other components (e.g., the CDI module 168, the behavioral engine 166, and the segmentation engine 172 which will be discussed in detail below) to result in data that may be stored in the various data stores.

Upon receiving certain targeting criteria, the targeting engine 162 returns a subscriber base that meets the specified targeting criteria. Additionally, the targeting engine conducts campaign scenario modeling, which involves running campaign tests and "what if" scenarios for the purpose of campaign planning, with the goal of planning an optimally successful campaign. In various embodiments, the targeting engine 162 may assist in determining targeting criteria to maximize the effectiveness of the campaign.

The behavioral engine 166 of the campaign analytics unit 124 associates segments from the segmentation engine 172 with subscribers based on the subscribers' behaviors. Such categories may include Sports, News, Entertainment, or other potential subscriber interests. The behavioral engine 166 utilizes events recorded by the event handler 130 and various behavior rules defined by the carrier, to determine the appropriate segment assignments for each subscriber. The segments assigned by the behavioral engine 166 augments the demographic data stored by the CDI module 168. Demographic data may be linked to behavioral data to target specific subscribers for a specific campaign may leverage both demographic data and behavioral data for an existing customer base.

The CDI module 168 of the campaign analytics unit 124 imports data from various internal customer data sources (i.e., carrier sources) with multiple file formats, and augments that data with customer data from external sources such as publishers, advertisers or $3^{rd}$ party data (i.e., InfoUSA) into a single customer data store. The CDI module 168 may compile the data from the various sources and store the compiled data in the subscriber data store 138. The primary type of data in the subscriber data store 138 generated by the CDI 168 is demographic data (age, gender, marital status, and the like). In order to integrate the internal and external data, the CDI 168 matches data by relating and/or associating data. In various embodiments, this is performed by identifying a primary key. Additionally, the CDI 168 transforms data into a common file format, and merges the data. Finally the CDI 168 cleans up merged the data by removing duplicates (i.e., "de-duplicating"). The CDI 168 additionally imports multiple incoming file formats (i.e., comma delimited, XML, and the like) through the use of a tool without requiring coding.

The reporting engine 170 of the campaign analytics unit 124 performs what is commonly referred to in the industry as Web Analytics, or data mining. The reporting engine 170 produces the following reports: status and/or results of in-progress campaigns (i.e., near real-time statistics), status and/or results of past campaigns, statistics on forecast versus actual campaign data, statistics on targeting results, statistics on performance according to publisher, and statistics on performance according to advertisement. Additionally, the reporting engine 170 enables the user to create custom reports on any data that is stored in the data stores 112 discussed below.

The segmentation engine 172 divides the subscriber base into fine-grain segments to classify subscribers into groups that may be used to target, thereby organizing and managing the inventory. Once segments are determined at a fine-grain level, higher-level segments may be determined by combining fine-grain segments. For example, the segment of subscribers under the age of 18 may be determined by combining the segments of married and unmarried males and females under the age of 18. As another example, the segment of unmarried men may be determined by combining all the segments for different age groups of unmarried men.

The segments enable advertisers to target advertising campaigns to various groups, and purchase inventory in order to effectively reach those groups. For example, if an advertiser wants to target all males, the advertiser could seek to purchase inventory from each of the segments that include male subscribers, or essentially any inventory within the male segments of the dimension 402.

The carrier is in a unique position to be able to segment the inventory down to such a fine-grained, segmented level, because the carrier has access to more detailed information about the individual subscriber than, for comparison, an internet services provider or cable television provider who commonly sell advertising spots.

It is possible to target a campaign at a high level, i.e., targeting multiple segments in a dimension of the total inventory. For example, a campaign may be targeted at all women, which would include both married and unmarried segments, and all of the age segments. When a campaign is targeted to a high level that encompasses multiple segments, rather than targeting specific segments, the impressions sold or reserved are distributed across the segments within the targeted high level as per the inventory rules. For example, when a campaign is targeted at females, the sold impressions are divided over each of the segments for females within the dimension 402. The sold impressions may be divided in equal number over each of the segments. In another example, when a campaign is targeted at females, the sold impressions are divided over the segments for females within the dimension according to the inventory rules which may dictate, for example, division of sold impressions over a ratio of available impressions in the various segments.

Returning to FIG. 1, the campaign delivery unit 110 comprises various components, which may be implemented in hardware, software, or a combination of hardware and software. The campaign delivery unit 110 is responsible for delivering advertisements to mobile devices 104. Specifically, the campaign delivery unit 110 comprises a delivery agent/advertisement server 126, a campaign execution engine 128, and an event handler 130. The campaign delivery unit 110 is operably linked to the data stores 112 such that data in the various data stores 112 may be utilized by the delivery agent/advertisement server 126, the campaign execution engine 128, and the event handler 130.

The delivery agent/advertisement server 126 generally receives advertisement requests (in case of pull ads) from a client or server-based application, requests an advertisement from the campaign execution engine 128, and responds with an advertisement to be served. In case of push advertisements, the delivery agent/advertisement server 126 receives the advertisement content from the campaign execution engine 128 and sends the content to the mobile devices 104. The delivery agent/advertisement server 126 uses the specific protocols needed receive advertisement requests and deliver advertisements. In various embodiments, the primary protocol used for receiving advertisement requests and delivering advertisements is HTTP.

The campaign execution engine 128 executes advertisement campaigns for various segments defined and activated with the campaign planning unit 108. The campaign execution engine 128 serves the advertisements for a given campaign upon receiving the advertisement requests or determines the appropriate advertisement to be served based on complex rules and parameters. In various embodiments, some criteria involved in determining the correct advertisement to serve up include: 1) subscriber data (including segments for behavioral or demographic targeting), 2) campaign weighting (i.e., bid pricing, actual impressions delivered vs. planned impressions), 3) advertisement weighting and carrier delivery rules (e.g., frequency capping, advertisement placement restrictions), 4) publisher requirements (i.e., different advertisements for different publishers and different spots), 5) publisher content type (i.e., type of media being published such as WAP, Multimedia, and the like), 6) time of day, 7) location of the subscriber (in various embodiments, location is passed to the mobile device from the publisher, for example, subscriber zip code, or carrier, for example, GPS defined location), and 8) contextual (e.g., the advertisement is selected as a result of what the user of the device is doing, such as performing a search with keywords. The context of keywords, defined as part of campaign, or a keyword passed to the advertisement management system from the publisher can be used to push related advertisements).

The campaign execution engine 128 receives some or all of the following information when an advertisement is requested: the subscriber id for the mobile device 104, the publisher (i.e., spot id), the content type, the location, and one or more keywords. The campaign execution engine 128 uses this information to determine the set of campaigns that match the request, accomplished by looking for campaigns associated with the subscriber id, the segment to which the subscriber is assigned, and the spot id of the request.

The event handler 130 receives advertisement events from the campaign execution engine, user actions or other sources, and records those events into an events database. The event handler 130 processes events as needed. For either push or pull advertisements, the campaign execution engine sends the "impression" delivery event to the event handler 130. For user actions, referred to in the industry as "click" events (click-to-URL, click-to-call, click-for-SMS), the event handler 130 records the event and may call another component for subsequent action such as, for example, sending an SMS, or directing to another WAP site. Other sources of events include the mobile wallet and applications running on the mobile device 104 (such as, for example, a multimedia player and downloaded JAVA 2 Micro Edition "J2ME" applications). Each event handled by the event handler 130 may be used in billing and analytics (which are described in greater detail herein).

The data stores 112 comprise various databases, including a publisher inventory 132, an advertisement content store 134, a billing events store 136, a subscriber data store 138, a carrier delivery rules store 140, and a campaign data store 142. The publisher inventory 132 may store tables of available inventory for various segments (to be discussed in greater detail herein) and reserved or sold inventory for various segments. The records in the publisher inventory 132 may be broken down for each month of the year. The advertisement content store 134 may store the entire stock of advertisements that may be managed by the advertisement fulfillment system 102, and transferred over to storage in an advertisements store on a mobile device 104. The billing events store 136 stores invoicing data that may be used in billing advertising agencies, and settlement records that may be used in settling up with publishers for campaigns run on the system.

The subscriber data store 138 stores subscriber data pertaining to each user that subscribes to the carrier, including subscriber identifiers, demographic data, and a profile for the subscriber based on usage behaviors exhibited by the subscriber. The data in the subscriber data store 138 may be continuously or periodically updated. The carrier delivery rules store 140 stores rules relating to campaigns or particular advertisements or types of advertisements pertaining to how and when advertisements may be displayed. For example, a carrier rule may impose restrictions on frequency of advertisement display, advertisement restrictions such as competitive exclusion or language, and campaign weighting and priority.

The campaign data store 142 stores data relating to campaigns, including, for example, targeting information, progress in a campaign, impression counts for specific advertisements, duration of the campaign, and the like. The data stores 112 are populated by various data sources 144. The data sources 144 include a subscriber mobile wallet 146 that contains personal identifying and financial data for the user of the mobile device, internal consumer info 148 maintained by the carrier, external consumer info 150 maintained by third parties, and a billing system 152 used for managing billing for advertising (as opposed to the billing system for the telecommunication services provided by the mobile device).

In various embodiments, the mobile device 104 comprises a cellular or wireless telephone, personal digital assistant ("PDA"), handheld computer, or the like operable as a mobile communication device when used in conjunction with telecommunication services provided by a carrier. The mobile device 104 comprises, in addition to its basic functionality for communication, hardware and software operable to store a set of advertisements, and rotate the advertisements in a display in various applications.

Figure 6:
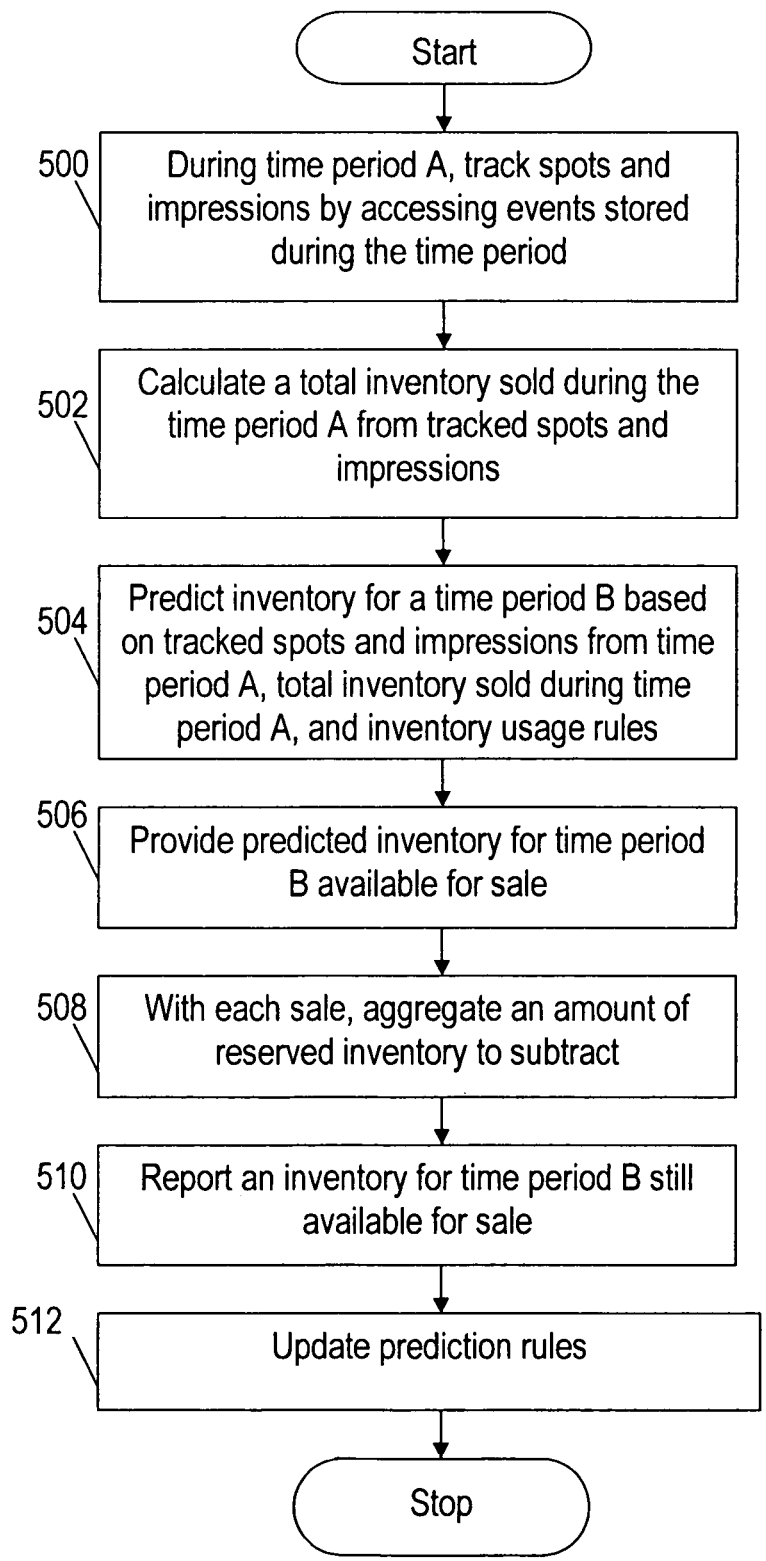
FIG. 6 is a block diagram logic flow diagram of a method for inventory management integrating subscriber and targeting data according to various embodiments of the present disclosure.

Referring now to FIG. 6, a method of inventory management integrating subscriber and targeting data is shown. During a time period A (such as a first month), the system 100 tracks the spots and impressions (block 500). Specifically, as discussed above, the events handler stores records of events for each advertisement served up such as, for example, any click-through action responding to the advertisement, the advertisement's identifier, the advertiser's identifier, campaign identifier for the campaign of which the advertisement is part, the spot into which the advertisement is served, the identifier of the subscriber to whom the advertisement was served, the date and time the advertisement was served. Based on the events that were recorded during the time period A, at the end of the time period A, the inventory calculator/generator 304 calculates a total inventory sold during the time period A (block 502). Specifically, by using the known number of impressions for each advertisement and the identity of all the spots, and the number of times each spot was utilized, the total number of impressions and spots (utilized for all the advertisements displayed) may be determined.

Based on the tracked spots and impressions resulting in a total inventory for time period A, the inventory calculator/generator 304 predicts a future inventory for a time period B (such as the month following the first month, time period A) (block 504). In various embodiments, the inventory for the time period B can be reasonably estimated from the inventory for time period A, given the usage patterns that emerge. Inventory rules defined by usage patterns may be applied during block 504 to increase the accuracy of the predicted inventory for the time period B. For example, a usage pattern may emerge showing that subscribers' usage of the browser is increasing at the rate of 20%, therefore resulting in 20% more impressions available in a same number of spots. An inventory rule then may be applied to the tracked inventory of time period A, to increase the tracked inventory by 20% to result in a more accurate predicted inventory for time period B.

The carrier then provides the predicted inventory for time period B available for sale (block 506). The carrier may sell the predicted inventory in segments according to targeting criteria that help advertisers select which inventory to purchase, since the carrier has control over where, how, and specifically to whom the advertisements are delivered. The carrier may also sell the predicted inventory in individual units, i.e., individual impressions.

With each sale of inventory for time period B, the used inventory manager/store 302 aggregates the inventory sold and subtracts the aggregate from the predicted total inventory for time period B to obtain the mount of inventory that remains available for sale (block 508). The used inventory manager/store 302 reports the inventory for time period B that remains available for sale (block 510).

As shown in block 512, during each time period (for example, for each month or quarter of the year), the spots and impressions events are tracked to predict inventory for subsequent time periods, such as the following month(s), quarter(s), or years. As each additional time period is tracked and used in predicting inventory in subsequent months, the most recent time period's inventory may be used to update the prediction rules used to calculate predicted inventory and update the inventory rules. For each successive time period, the method of FIG. 6 is repeated.

Figure 7:
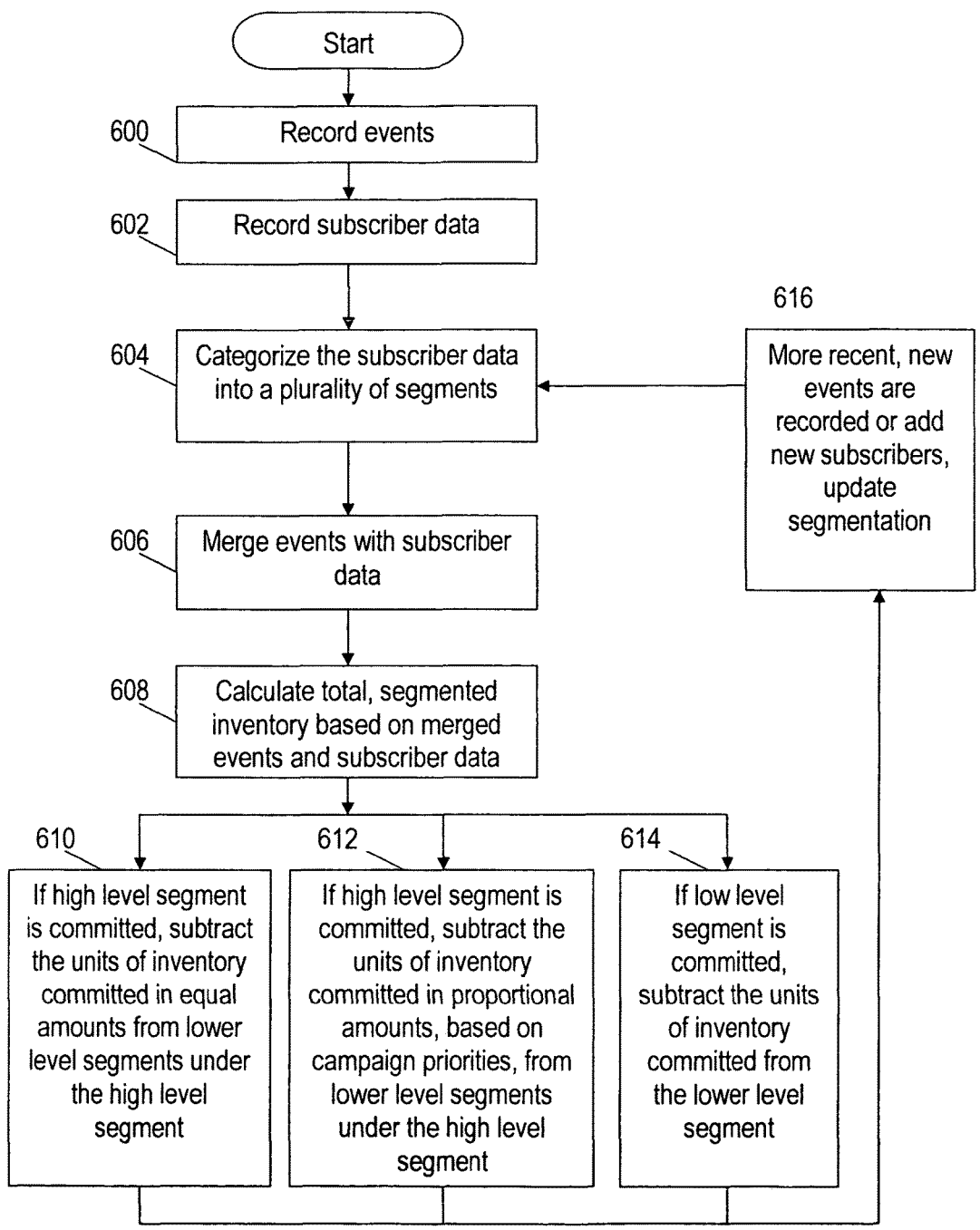
FIG. 7 is a flow chart of a method of data segmentation for inventorying and campaign targeting according to various embodiments of the present disclosure.

Referring now to FIG. 7, a method for data segmentation for inventorying and campaign targeting is shown. The method begins with the events handler 130 recording events for each advertisement displayed in the events store 308 (block 600). Event handling is described in greater detail in related, commonly owned U.S. application Ser. No. 11/449, 078, filed Jun. 8, 2006, entitled "Communication Device Usage Event Profiling," by Robert Urbanek. The events stored may be associated with a particular subscriber based on the unique subscriber identifier. The events stored may comprise behavioral information such as, for example, what sites a particular subscriber visited, applications used by the particular subscriber, and actions taken by the subscriber in response to an advertisement, such as clicking through on an advertisement. The ad fulfillment system 102 also records subscriber data in the subscriber data store 138 (block 602). The subscriber data stored may be associated with each particular subscriber based on the unique subscriber identifier. The subscriber data may comprise demographic data pertaining to each subscriber provided by the subscriber when signing up for the carrier's service, provided by the subscriber in service polls, and the like.

The segmentation engine 172 categorizes the subscriber data into a plurality of segments (block 604). The plurality of segments may be selected by the carrier to organize inventory according to targeting criteria used by advertisers, demographic groupings, or the like. In various embodiments with segmentation along demographic lines, each subscriber fits into one and only one segment. The segmentation engine 172 additionally stores the subscriber data as segmented in the segmented data store 174.

The inventory calculator/generator 304 merges the events data with the segmented subscriber data (block 606). For each recorded event, one of the fields the events data store 138 stores is the unique subscriber identifier for the subscriber involved in the event. In various embodiments, the subscriber identifier is sent to the advertisement fulfillment system 102 in an HTTP header with the other event data. Similarly, the unique subscriber identifier is one of the fields stored in the subscriber data store 138. Using the subscriber identifier fields for each of the data stores, the events data and segmented subscriber data may be merged by lining up all of the records by the subscriber identifier field.

The inventory calculator/generator 304 then calculates the total segmented inventory based on the merged events data and segmented subscriber data, resulting in a fine-grained inventory (block 608). The total segmented inventory is the number of impressions and spots (from the events data) that is classified by segment (from the segmented subscriber data). For example, the inventory calculator/generator 304 calculates the total number of impressions and spots sold that were displayed in events to unmarried males, ages 18-25. In doing so, the inventory calculator/generator organizes the total inventory into groupings that may be used to sell segments of inventory according to the demographic or behavioral group that an advertiser wishes to target.

The total segmented inventory is provided to the used inventory manager 302. The used inventory manager 302 stores the total segmented inventory as available inventory, and as units of inventory are committed (by sale or reservation), the used inventory manager 302 updates the available inventory by subtracting the sold or reserved units based on inventory rules and campaign parameters such as the number of impressions purchased or reserved, the targeted segments, the time of day, and the like.

The used inventory manager 302 may use various inventory rules to subtract the sold or reserved units from the available inventory. According to a first inventory rule (block 610), if inventory at a high level is committed, then the used inventory manager 302 subtracts the units of inventory committed in equal amounts from each the segments encompassed by the high level. For example, if an advertiser purchased 15,000 impressions (i.e., units of inventory) from the high level "married male," applying this inventory rule the used inventory manager 302 subtracts 3,000 impressions from each of the segments: 3,000 from "married males under age 18 and under," 3,000 from "married males ages 18-25," 3,000 from "married males ages 25-35," 3,000 from "married males ages 35-40," and 3,000 from "married males over age 40."

According to a second inventory rule (block 612), if inventory at a high level is committed, then the used inventory manager 302 subtracts the units of inventory committed in proportionate amounts from the segments encompassed by the high level, based on campaign priority. For example, if an advertiser purchased 17,500 impressions (i.e., units of inventory) from the high level "married male" and the campaign prioritizes the two oldest group of males as segments that are twice as important as the others, applying this inventory rule the used inventory manager 302 subtracts 2,500 impressions from lower priority segments, and 5,000 from higher priority segments: 2,500 from "married males ages 18 and under," 2,500 from "married males ages 18-25," 2,500 from "married males ages 25-35," and 5,000 from "married males 35-40," and 5,000 from "married males over age 40."

According to a third inventory rule (block 614), if inventory for an individual segment is committed, then the used inventory manager 302 subtracts the units of inventory committed directly from the total for the segment that were sold or reserved. For example, if an advertiser purchased 25,000 impressions (i.e., units of inventory) from the segment "married female ages 25-35," applying this inventory rule the used inventory manager 302 subtracts 25,000 impressions directly from the number of available impressions for the segment "married female ages 25-35."

In various embodiments, if inventory at a high level is committed in a sale and one or more individual segments encompassed by the high level segment are fully committed prior to the sale (i.e., no inventory remains available for at least one individual segment encompassed by the high level), then the used inventory manager 302 may apply an inventory rule to not subtract any units from the previously fully committed segment, and may apply either of the inventory rules of blocks 610 and 612 to subtract the units of inventory from the other segments encompassed by the high level that do have available inventory.

As time passes and more recent, new events are recorded and/or new subscribers are added, the advertisement fulfillment system 102 updates the segmentation (block 616). The updates may be regularly scheduled, such as daily, weekly, monthly and the like, or may be performed in relative real time, such that the segmentation appears to be readily updated to any user reviewing the segments of inventory.

Figure 8:
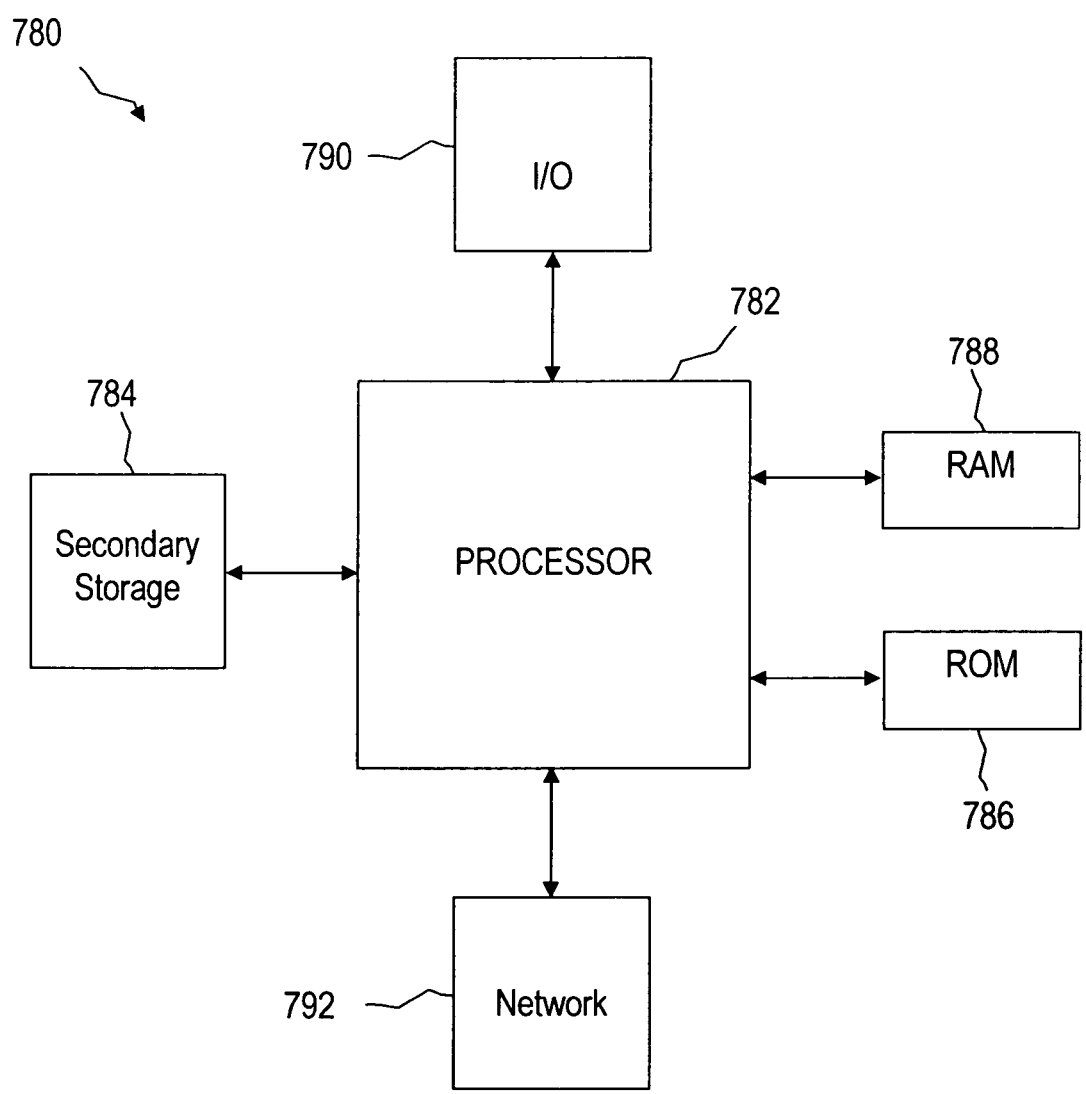
FIG. 8 shows an illustrative general purpose computer system suitable for implementing, at least in part, the several embodiments of the disclosure.

The inventory management systems and methods integrating subscriber and targeting data may be implemented, at least partially, on any general-purpose computer with sufficient processing power, memory resources, and network throughput capability to handle the necessary workload placed upon it. FIG. 8 illustrates a typical, general-purpose computer system suitable for implementing one or more embodiments disclosed herein. The computer system 780 includes a processor 782 (which may be referred to as a central processor unit or CPU) that is in communication with memory devices including secondary storage 784, reads only memory (ROM) 786, random access memory (RAM) 788, input/output (I/O) devices 790 and network connectivity devices 792. The processor may be implemented as one or more CPU chips.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are reads during program execution. ROM 786 is a non-volatile memory device which typically has a small memory capacity relative to the larger memory capacity of secondary storage. The RAM 788 is used to store volatile data and perhaps to store instructions. Access to both ROM 786 and RAM 788 is typically faster than to secondary storage 784.

I/O devices 790 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 792 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 792 may enable the processor 782 to communicate with an Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave Such information, which may include data or instructions to be executed using processor 782 for example, may be received from and outputted to the network, for example, in the form of a computer data baseband signal or signal embodied in a carrier wave. The baseband signal or signal embodied in the carrier wave generated by the network connectivity devices 792 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A method for creating a future advertisement inventory for use in connection with future advertisement spots that are delivered to mobile devices on a network of a wireless carrier, the method comprising:
recording, in a non-transitory memory of an events data store by executing an event handler that configures a processor of a server, event data for a plurality of advertisement events on mobile devices viewed by a plurality of subscribers, the event data for each of the plurality of advertisement events corresponding to a historical advertisement inventory viewed on a mobile device by a subscriber of the wireless carrier, and the event data including an advertisement identifier, a subscriber identifier, and a behavior on a mobile device by that subscriber;

storing, in a non-transitory memory, subscriber data for the plurality of subscribers, the subscriber data for each of the plurality of subscribers including the subscriber identifier and demographic information;

creating and storing, by a subscriber engine stored as a set of computer readable instructions on a non-transitory computer readable storage medium and executable by a processor of a server, segmented subscriber data for each of the plurality of subscribers, wherein the creating of segmented subscriber data comprises:

segmenting, by the subscriber engine, the subscriber data into a plurality of segments including lowest-level segments and higher-level segments, wherein each of the higher-level segments is a combination of two or more of the lowest-level segments, and assigning, by the subscriber engine, at least one of the lowest-level segments based on the event data for that subscriber, and at least one of the lowest-level segments based on the demographic information for that subscriber;

creating and storing in non-transitory memory, by an inventory calculator stored as a set of computer readable instructions on a non-transitory computer readable storage medium and executable by a processor to configure a server, segmented event data for each of the plurality of advertisement events, wherein the creating of segmented event data includes merging the event data for the plurality of advertisement events with the segmented subscriber data for the plurality of subscribers based on subscriber identifiers in the event data and subscriber identifiers in the segmented subscriber data;

creating in a non-transitory memory, by the inventory calculator, the future advertisement inventory based on the creation of the segmented subscriber data and the creation of the segmented event data, for use in future advertising spots delivered to the plurality of subscribers via corresponding mobile devices coupled to the network, wherein the creating of future advertisement inventory includes analysis of the segmented subscriber data and the segmented event data;

updating, by an inventory manager stored as a set of computer readable instructions on a non-transitory computer readable storage medium and executable by a processor to configure a server, the future advertisement inventory based on at least one inventory rule by reducing inventory in a distributed manner from each of the lowest-level segments encompassed by a higher-level segment when inventory at the higher-level segment is committed, wherein the at least one inventory rule comprises at least one of reducing inventory from each of the lowest-level segments encompassed by the higher-level segment in equal amounts or reducing inventory from each of the lowest-level segments encompassed by the higher-level segment in proportionate amounts based on at least one of a campaign priority or an available inventory for each of the lowest-level segments; and delivering, via the network by a delivery agent executing on a processor of a server, at least one advertisement to an advertisement spot in a mobile device based on the creation of the segmented subscriber data and the segmented event data and the updated future advertisement inventory.

2. The method of claim 1, further comprising: revising, by the inventory calculator, the future advertisement inventory as additional historical inventory for subsequent time periods is known to the inventory calculator.

3. The method of claim 1, wherein a segment is at least one of a demographic grouping in a hierarchy or a behavioral grouping in a hierarchy.

4. The method of claim 1, wherein creating the future advertisement inventory further comprises: adjusting an amount of spots in the future advertisement inventory based on impressions on a mobile device from a historical inventory stored in non-transitory memory, wherein the adjustment to the future advertisement inventory corresponds with growth or decline of usage.

5. The method of claim 1, wherein creating the future advertisement inventory further comprises:
tracking the historical inventory for one month,
estimating the future advertisement inventory for at least a subsequent month by using the historical inventory that is tracked for the one month, and
each month, updating the future inventory with each subsequent month of tracked historical inventory.

6. The method of claim 1, wherein creating the future inventory further comprises:
tracking the historical inventory every month for at least one year,
estimating the future inventory corresponding to a particular month in a subsequent year by using the historical inventory that is tracked for each month; and
each year, updating the future inventory for each particular month with the historical inventory that is tracked for each month during that year.

7. The method of claim 1, wherein updating the future advertisement inventory comprises reducing impressions or spots for a segment directly from the available inventory for the segment.

8. A system for creating a future advertisement inventory for use in connection with future advertisement spots that are delivered to mobile devices on a network of a carrier, the system comprising:

an events data store communicatively coupled to the network and comprising non-transitory memory that records event data for a plurality of advertisement events on mobile devices viewed by a plurality of subscribers of the wireless carrier, the event data for each of the plurality of advertisement events corresponding to a historical advertisement inventory viewed on a mobile device by a subscriber, and the event data including an advertisement identifier, a subscriber identifier, and a behavior on a mobile device by that subscriber;

a subscriber data store communicatively coupled to the network and comprising non-transitory memory that records subscriber data for a plurality of subscribers associated with mobile devices that connect to the network of the carrier, the subscriber data for each of the plurality of subscribers including the subscriber identifier and demographic information;

a server communicatively coupled to the subscriber data store and the event data store, the server comprising:
a processor,
a non-transitory memory coupled to the at least one processor,
a segmentation engine stored in the non-transitory memory that upon execution by the processor, configures at least one processor of the server to create segmented subscriber data for each of the plurality of subscribers by:
- segmenting the subscriber data into a plurality of segments including fine-grained segments and higher-level segments, wherein each of the higher-level segments is a combination of two or more of the fine-grained segments, and
- assigning one or more of the fine-grained segments based on the event data for that subscriber one or more of the fine-grained segments based on the demographic information for that subscriber, an inventory calculator stored in the non-transitory memory that upon execution by the processor, configures at least one processor of the server to:
- create segmented event data for each of the plurality of advertisement events by merging the event data for the plurality of advertisement events with the segmented subscriber data for the plurality of subscribers based on subscriber identifiers in the event data and subscriber identifiers in the segmented subscriber data, and
- create a future advertisement inventory based on the creation of the segmented subscriber data and the creation of the segmented event data, wherein the future advertisement inventory corresponds to future advertising spots delivered to the plurality of subscribers via mobile devices coupled to the network, wherein creating the future advertisement inventory includes analyzing the segmented subscriber data and the segmented event data; and an inventory manager stored in the non-transitory memory that upon execution by the processor, configures at least one processor of the server to update the future advertisement inventory based on at least one inventory rule by reducing inventory in a distributed manner from each of the fine-grained segments encompassed by a higher-level segment when inventory at the higher-level segment is committed, wherein the at least one inventory rule comprises at least one of reducing inventory from each of the fine-grained segments encompassed by the higher-level segment in equal amounts or reducing inventory from each of the fine-grained segments encompassed by the higher-level segment in proportionate amounts based on at least one of a campaign priority or an available inventory for each of the fine-grained segments; and a delivery server coupled to the server and the network, the delivery server comprising a processor and a campaign delivery unit stored in the non-transitory memory that upon execution by the processor, configures the processor of the delivery server to deliver one or more advertisements via the network from the updated future advertisement inventory to an advertisement spot in a mobile device according to a campaign that targets specific segments.

9. The system of claim 8, further comprising:
an inventory rules data store that is communicatively coupled to the server and stores, in non-transitory memory, a plurality of inventory rules including the at least one inventory rule, wherein the plurality of inventory rules comprise usage patterns to increase or decrease predicted inventory, and distribution rules for how to distribute inventory committed for the higher-level segments over the fine-grained segments encompassed by the higher-level segments.

10. The system of claim 9, wherein at least one inventory rule of the plurality of inventory rules comprises reducing impressions or spots for a segment directly from an available inventory for the segment.

11. The system of claim 8, wherein the server further comprises:
an inventory reporter stored in the non-transitory memory that upon execution by the processor, configures at least one processor of the server to report amounts of inventory committed and amounts of inventory remaining available for use in advertising campaigns.

12. The system of claim 11, wherein the system further comprises a campaign data store that is communicatively coupled to the server and stores, in non-transitory memory, campaign data, wherein the campaign data includes at least one of: a campaign start date, a campaign end date, one or more segments targeted by the campaign, a time of day during which the campaign is conducted, a location targeted by the campaign, or one or more spots targeted by the campaign.

\* \* \* \* \*